US011474780B2

(12) United States Patent
Yang et al.

(10) Patent No.: US 11,474,780 B2
(45) Date of Patent: Oct. 18, 2022

(54) METHOD OF PROVIDING SPEECH RECOGNITION SERVICE AND ELECTRONIC DEVICE FOR SAME

(71) Applicant: SAMSUNG ELECTRONICS CO., LTD., Suwon-si (KR)

(72) Inventors: Jaeyoung Yang, Suwon-si (KR); Donghee Suh, Suwon-si (KR); Hojun Jaygarl, Suwon-si (KR); Minsung Kim, Suwon-si (KR); Jinwoong Kim, Suwon-si (KR); Youngbin Kim, Suwon-si (KR); Kwangbin Lee, Suwon-si (KR); Youngmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 16/791,073

(22) Filed: Feb. 14, 2020

(65) Prior Publication Data
US 2020/0264839 A1 Aug. 20, 2020

(30) Foreign Application Priority Data

Feb. 14, 2019 (KR) .................. 10-2019-0017305

(51) Int. Cl.
G10L 15/20 (2006.01)
G10L 17/00 (2013.01)
(Continued)

(52) U.S. Cl.
CPC .............. G06F 3/167 (2013.01); G10L 15/22 (2013.01); G10L 2015/223 (2013.01)

(58) Field of Classification Search
CPC ... G10L 15/22; G10L 15/30; G10L 2015/223; G10L 15/00; G06F 3/167; H04N 1/00403
(Continued)

(56) References Cited

U.S. PATENT DOCUMENTS

2011/0184730 A1* 7/2011 LeBeau .................. G10L 15/30
704/235
2014/0100850 A1 4/2014 Won
(Continued)

FOREIGN PATENT DOCUMENTS

EP  3 327 719   5/2018
EP  3 385 839  10/2018
(Continued)

OTHER PUBLICATIONS

International Search Report and Written Opinion dated Jun. 1, 2020 in counterpart International Application No. PCT/KR2020/002062.
(Continued)

Primary Examiner — George C Monikang
(74) Attorney, Agent, or Firm — Nixon & Vanderhye P.C.

(57) ABSTRACT

An electronic device includes a communication circuit, a display, a microphone, a processor operatively connected to the communication circuit, the display, and the microphone, and a memory operatively connected to the processor, wherein the memory is configured to store instructions which, when executed, cause the processor to control the electronic device to: transmit information related to a predetermined event to a server through the communication circuit in response to detection of the predetermined event through an application, display a user interface through the display in response to reception of information related to the user interface including at least one visual object selectable by a user to control a function of the application through the communication circuit, receive a user-uttered input for selecting one of the at least one visual object included in the user interface through the microphone, and transmit information related to the user-uttered input to the server through the communication circuit to perform a function corresponding to the visual object selected by the user-uttered input.

20 Claims, 21 Drawing Sheets

(51) Int. Cl.
  *G06F 3/16*    (2006.01)
  *G10L 15/22*   (2006.01)

(58) Field of Classification Search
  USPC .................................................. 704/231, 246
  See application file for complete search history.

(56)                References Cited

U.S. PATENT DOCUMENTS

| | | |
|---|---|---|
| 2014/0317502 A1 | 10/2014 | Brown et al. |
| 2016/0180026 A1 | 6/2016 | Kim et al. |
| 2018/0261220 A1 | 9/2018 | Higbie et al. |
| 2018/0314489 A1 | 11/2018 | Seo et al. |
| 2018/0349084 A1 | 12/2018 | Nagasaka et al. |
| 2019/0005957 A1 | 1/2019 | Yoon |

FOREIGN PATENT DOCUMENTS

| | | |
|---|---|---|
| KR | 10-2016-0076264 | 6/2016 |
| KR | 10-2017-0014297 | 2/2017 |
| KR | 10-1860269 | 5/2018 |
| KR | 10-2018-0100131 | 9/2018 |
| KR | 10-2019-0001699 | 1/2019 |

OTHER PUBLICATIONS

Search Report and Written Opinion dated Jun. 16, 2020 in counterpart European Application No. EP20157444.9.
European Office Action dated Nov. 29, 2021 for EP Application No. 20157444.9.

\* cited by examiner

METHOD OF PROVIDING SPEECH RECOGNITION SERVICE AND ELECTRONIC DEVICE FOR SAME

CROSS-REFERENCE TO RELATED APPLICATION

This application is based on and claims priority under 35 U.S.C. § 119 to Korean Patent Application No. 10-2019-0017305, filed on Feb. 14, 2019, in the Korean Intellectual Property Office, the disclosure of which is incorporated by reference herein in its entirety.

BACKGROUND

1) Field

The disclosure relates to a method of providing a speech recognition service by an electronic device and an electronic device for the same.

2) Description of Related Art

Recent electronic devices propose various types of input schemes in order to support an interaction with a user. For example, electronic devices may operate a voice input scheme of receiving user-uttered input (for example, a voice) based on execution of a specific application (for example, S-Voice, Bixby, or Siri). Further, electronic devices may recognize a user-uttered input, derive intent of the user utterance, and perform an operation (for example, executing an application installed in the electronic device and controlling a function thereof) corresponding to the intent of the utterance. This may be implemented based on an artificial intelligence system. The artificial intelligence system may refer to a computer system for implementing human-level intelligence and may learn and decide by itself, and further improves its own recognition rate as it is more frequently used. An artificial intelligence technology may include a machine-learning (deep learning) technology using a self-classification/learning algorithm and element technologies (for example, a linguistic understanding technology of recognizing human languages/characters) and an inference/prediction technology of determining information to perform logical inference and prediction) of working in an intelligent way, similar to the way that the human recognizes and determines with his/her brain using a machine-learning algorithm.

An electronic device provides a voice recognition service only when a user-uttered input for receiving the voice recognition service is received from a user. Accordingly, a user not having strong intent to use such a voice recognition service is not likely to use (has low usability for) the voice recognition service. Therefore, solutions for increasing the usability of such a voice recognition service by a user not intending to use the voice recognition service may be required.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method of providing a voice recognition service to a user of an electronic device based on a predetermined event and an electronic device for the same.

In accordance with an example aspect of the disclosure, an electronic device is provided. The electronic device includes: a communication circuit; a display; a microphone; a processor operatively connected to the communication circuit, the display, and the microphone; and a memory operatively connected to the processor, wherein the memory is configured to store instructions which, when executed, cause the processor to control the electronic device to: transmit information related to a predetermined event to a server through the communication circuit in response to detection of the predetermined event through an application, display a user interface through the display in response to reception of information related to the user interface including at least one visual object selectable by a user to control a function of the application through the communication circuit, receive a user-uttered input for selecting one of the at least one visual object included in the user interface through the microphone, and transmit information related to the user-uttered input to the server through the communication circuit to perform a function corresponding to the visual object selected by the user-uttered input.

In accordance with another example aspect of the disclosure, a server is provided. The server includes: a communication circuit; a processor operatively connected to the communication circuit; and a memory operatively connected to the processor, wherein the memory is configured to store instructions which, when executed, cause the processor to control the server to: receive information related to a predetermined event from an electronic device through the communication circuit, generate a user interface including at least one visual object selectable by a user to control a function of an application corresponding to the predetermined event based on the information related to the predetermined event, transmit information related to the user interface to the electronic device through the communication circuit, receive information related to a user-uttered input for selecting one of the at least one visual object included in the user interface from the electronic device through the communication circuit, and transmit a control signal for performing a function of an application corresponding to the visual object selected by the user-uttered input to the electronic device through the communication circuit based on the information related to the user-uttered input.

In accordance with another example aspect of the disclosure, a server is provided. The server includes: a communication circuit; a processor operatively connected to the communication circuit; and a memory operatively connected to the processor, wherein the memory is configured to store instructions which, when executed, cause the processor to control the server to: receive information related to a predetermined event from another server through the communication circuit, identify an electronic device in which an application corresponding to the predetermined event is installed, generate a user interface including at least one visual object selected by a user to control a function of the application corresponding to the predetermined event based on the information related to the predetermined event, transmit information related to the user interface to the electronic device through the communication circuit, receive information related to a user-uttered input for selecting one of the at least one visual object included in the user interface from the electronic device through the communication circuit, and transmit a control signal for performing a function corresponding to the visual object selected by the user-uttered input to the electronic device through the communication circuit based on the information related to the user-uttered input.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
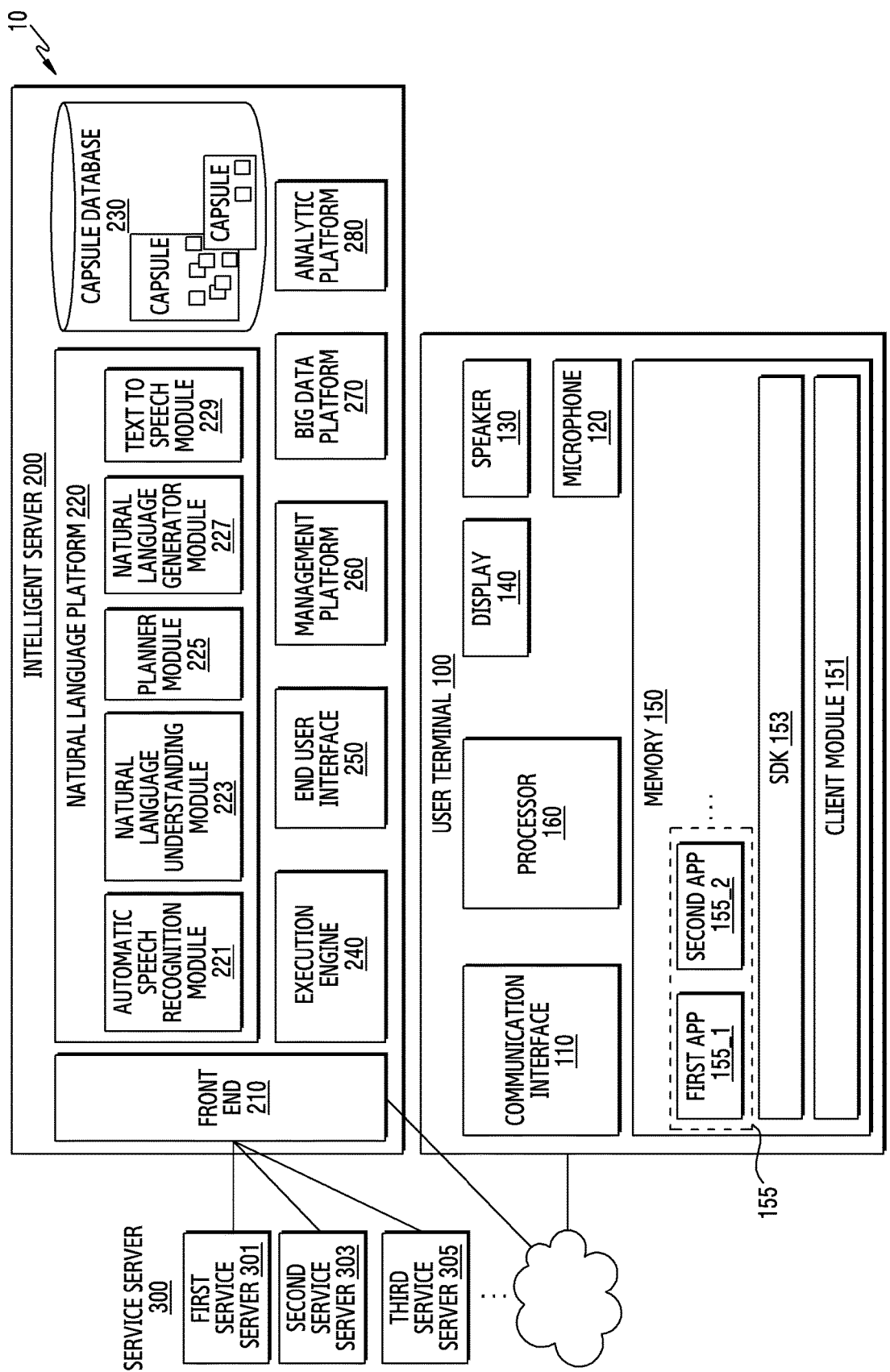
FIG. 1 is a block diagram illustrating an example integrated intelligence system according to an embodiment.

FIG. 1 is a block diagram illustrating an example integrated intelligence system according to an embodiment.

Referring to FIG. 1, an integrated intelligence system 10 according to an embodiment may include a user terminal 100, an intelligent server 200, and a service server 300.

The user terminal 100 according to an embodiment may be a terminal device (or an electronic device) capable of being connected to the Internet, and may include, for example, and without limitation, a mobile phone, a smart phone, a personal digital assistant (PDA), a notebook computer, a TV, white goods, a wearable device, an HMD, a smart speaker, or the like.

According to an embodiment, the user terminal 100 may include a communication interface (e.g., including communication circuitry) 110, a microphone 120, a speaker 130, a display 140, a memory 150, and a processor (e.g., including processing circuitry) 160. The listed elements may be operatively or electrically connected to each other.

According to an embodiment, the communication interface 110 may include various communication circuitry and be connected to an external device and configured to transmit and receive data. According to an embodiment, the microphone 120 may receive a sound (for example, a user's utterance) and convert the same into an electrical signal. According to an embodiment, the speaker 130 may output an electrical signal in the form of a sound (for example, a voice). According to an embodiment, the display 140 may be configured to display an image or a video. According to an embodiment, the display 140 may display a Graphic User Interface (GUI) of an executed app (or application).

According to an embodiment, the memory 150 may store a client module 151, a Software Development Kit (SDK) 153, and a plurality of apps (applications) 155. The client module 151 and the SDK 153 may configure a framework (or a solution program) for performing a universal function. Further, the client module 151 or the SDK 153 may configure a framework for processing voice input.

According to an embodiment, the memory 150 may include, for example, a program for performing predetermined functions of the plurality of apps 155. According to an embodiment, the plurality of apps 155 may include a first app 155_1 and a second app 155_2. According to an embodiment, the plurality of apps 155 may include a plurality of operations for performing predetermined functions. For example, the plurality of apps 155 may include, for example, and without limitation, at least one of an alarm app, a message app, and/or a schedule app, or the like. According to an embodiment, the plurality of apps 155 may be executed by the processor 160 and sequentially perform at least some of the plurality of operations.

According to an embodiment, the processor 160 may include various processing circuitry and control the overall operation of the user terminal 100. For example, the processor 160 may be electrically connected to the communication interface 110, the microphone 120, the speaker, 130, the display 140, and the memory 150, and may perform predetermined operations.

According to an embodiment, the processor 160 may execute a program stored in the memory 150 and perform a predetermined function. For example, the processor 160 may perform the following operation for processing a voice input by executing at least one of the client module 151 or the SDK 153. The processor 160 may control, for example, the operation of the plurality of apps 155 through the SDK 153. The following operation, which is the operation of the client module 151 or the SDK 153, may be performed by the processor 160.

According to an embodiment, the client module 151 may receive a voice input. For example, the client module 151 may generate a voice signal corresponding to a user utterance detected through the microphone 120. The client module 151 may transmit the received voice input to the intelligent server 200. According to an embodiment, the client module 151 may transmit status information of the user terminal 100 along with the received voice input to the intelligent server 200. The status information may be, for example, execution status information of the app.

According to an embodiment, the client module 151 may receive a result corresponding to the received voice input. For example, when the result corresponding to the received voice input can be obtained by the intelligent server 200, the client module 151 may receive the result corresponding to the received voice input. The client module 151 may display the received result on the display 140.

According to an embodiment, the client module 151 may receive a plan corresponding to the received voice input. The client module 151 may display the result obtained by performing the plurality of operations of the app on the display 140 according to the plan. For example, the client module 151 may sequentially display the execution results of a plurality of operations on the display. In another example, the user terminal 100 may display only some results of the plurality of operations (the result of the last operation) on the display.

According to an embodiment, the client module 151 may receive a request for acquiring information required for obtaining the result corresponding to the voice input from the intelligent server 200. The information required for obtaining the result may be, for example, status information of the user terminal 100. According to an embodiment, the client module 151 may transmit the required information to the intelligent server 200 in response to the request.

According to an embodiment, the client module 151 may transmit result information of the execution of a plurality of operations to the intelligent server 200 according to a plan. The intelligent server 200 may identify that the received voice input is correctly processed through the result information.

According to an embodiment, the client module 151 may include a voice recognition module. According to an embodiment, the client module 151 may recognize a voice input for performing a limited function through the voice recognition module. For example, the client module 151 may execute an intelligent app for processing a voice input to perform an organic operation through a predetermined input (for example, "Wake up!").

According to an embodiment, the intelligent server 200 may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligence (AI) system. The artificial intelligence system may, for example, and without limitation, be a rule-based system, a neural-network-based system (for example, a Feedforward Neural Network (FNN)) or a Recurrent Neural Network (RNN)), or the like. The artificial intelligence system may be a combination thereof or an artificial intelligence system different therefrom. According to an embodiment, the plan may be selected from a combination of predefined plans, or may be generated in real time in response to a user request. For example, the artificial intelligence system may select at least one plan from among a plurality of predefined plans.

According to an embodiment, the intelligent server 200 may transmit the result obtained by the generated plan to the user terminal 100, or may transmit the generated plan to the user terminal 100. According to an embodiment, the user terminal 100 may display the result obtained according to the plan on the display. According to an embodiment, the user terminal 100 may display the result of execution of operation according to the plan on the display.

According to an embodiment, the intelligent server 200 may include a front end 210, a natural language platform (e.g., including processing circuitry and/or executable program elements) 220, a capsule database (DB) 230, an execution engine 240, an end-user interface 250, a management platform 260, a big-data platform 270, and an analytic platform 280.

According to an embodiment, the front end 210 may receive the received voice input from the user terminal 100. The front end 210 may transmit a response to the voice input.

According to an embodiment, the natural language platform 220 may include an Automatic Speech Recognition (ASR) module (e.g., including processing circuitry and/or executable program elements) 221, a Natural Language Understanding (NLU) module (e.g., including processing circuitry and/or executable program elements) 223, a planner module (e.g., including processing circuitry and/or executable program elements) 225, a Natural Language Generator (NLG) module (e.g., including processing circuitry and/or executable program elements) 227, and/or a Text to Speech (TTS) module (e.g., including processing circuitry and/or executable program elements) 229.

According to an embodiment, the automatic speech recognition module 221 may include various processing circuitry and/or executable program elements and convert the voice input received from the user terminal 110 into text data. According to an embodiment, the natural language understanding module 223 may include various processing circuitry and/or executable program elements and detect a user's intent based on text data of the voice input. For example, the natural language understanding module 223 may detect a user's intent by performing syntactic analysis or semantic analysis. According to an embodiment, the natural language understanding module 223 may detect the meaning of a word extracted from the voice input based on a linguistic characteristic (for example, a grammatical element) of a morpheme or a phrase and match the detected meaning of the word with the intent, so as to determine the user's intent.

According to an embodiment, the planner module 225 may include various processing circuitry and/or executable program elements and generate a plan based on the intent determined by the natural language understanding module 223 and a parameter. According to an embodiment, the planner module 225 may determine a plurality of domains required for performing a task based on the determined intent. The planner module 225 may determine a plurality of operations included in the plurality of domains determined based on the intent. According to an embodiment, the planner module 225 may determine a parameter required for performing the plurality of determined operations or a result value output due to the execution of the plurality of operations. The parameter and the result value may be defined in a concept related to a predetermined type (or class). According to an embodiment, the plan may include a plurality of operations determined by the user's intent and a plurality of concepts. The planner module 225 may gradually (or hierarchically) determine the relationship between the plurality of operations and the plurality of concepts. For example, the planner module 225 may determine the execution order of the plurality of operations determined based on the user's intent based on the plurality of concepts. In other words, the planner module 225 may determine the execution order of the plurality of operations based on the parameter required for performing the plurality of operations and the result output due to the execution of the plurality of operations. Accordingly, the planner module 225 may generate a plan including information on the relationship (for example, ontology) between the plurality of operations and the plurality of concepts. The planner module 225 may generate a plan based on information stored in the capsule database 230 corresponding to a set of relationships between concepts and operations.

According to an embodiment, the natural language generator module 227 may include various processing circuitry and/or executable program elements and change predetermined information in the form of text. The information converted into the form of text may be in the form of natural language speech. The text-to-speech module 229 may include various processing circuitry and/or executable program elements and convert information in the form of text into information in the form of voice.

According to an embodiment, the capsule database 230 may store information on the relationship between a plurality of concepts and operations corresponding to a plurality of domains. For example, the capsule database 230 according to an embodiment may include a plurality of operation objects (action objects or action information) and concept objects (or concept information). According to an embodiment, the capsule database 230 may store a plurality of capsules in the form of, for example, a Concept Action Network (CAN). According to an embodiment, the plurality of capsules may be stored in a function registry included in the capsule database 230.

According to an embodiment, the capsule database 230 may include a strategy registry for storing strategy information required when a plan corresponding to a voice input is determined. When there is a plurality of plans corresponding to the voice input, the strategy information may include reference information for determining one plan. According to an embodiment, the capsule database 230 may include a follow-up registry storing the following operation to suggest the following operation to the user in a predetermined situation. The following operation may include, for example, the following speech. According to an embodiment, the capsule database 230 may include a layout registry storing layout information, which is information output through the user terminal 100. According to an embodiment, the capsule database 230 may include a vocabulary registry storing vocabulary information included in the capsule information. According to an embodiment, the capsule database 230 may include a dialog registry storing dialog (or interaction) information with the user.

According to an embodiment, the capsule database 230 may update the stored object through a developer tool. The developer tool may include a function editor for updating, for example, the operation object or the concept object. The developer tool may include a vocabulary editor for updating vocabularies. The developer tool may include a strategy editor for generating and registering strategy to determine a plan. The developer tool may include a dialog editor for generating dialog with the user. The developer tool may include a follow-up editor for activating the following goal and editing the following speech, which provides a hint. The follow-up goal may be determined based on the current goal, a user's preference, or an environment condition.

According to an embodiment, the capsule database 230 may be implemented within the user terminal 100. In other words, the user terminal 100 may include the capsule database 120, which stores information for determining an operation corresponding to the voice input.

According to an embodiment, the execution engine 240 may include various processing circuitry and/or executable program elements and obtain the result based on the generated plan. According to an embodiment, the end-user interface 250 may transmit the obtained result to the user terminal 100. Accordingly, the user terminal 100 may receive the result and provide the received result to the user. According to an embodiment, the management platform 260 may include various processing circuitry and/or executable program elements and manage the information used by the intelligent server 200. According to an embodiment, the big-data platform 270 may include various processing circuitry and/or executable program elements and collect data on the user. The analytic platform 280 according to an embodiment may include various processing circuitry and/ or executable program elements and manage the quality of service (QoS) of the intelligent server 200. For example, the analytic platform 280 may manage elements and a processing speed (or efficiency) of the intelligent server 200.

According to an embodiment, the service server 300 may provide a predetermined service (for example, order food or reserve a hotel) to the user terminal 100. According to an embodiment, the service server 300 may be a server operated by a third party. For example, the service server 300 may include a first service server 301, a second service server 303, and a third service server 305 operated by different third parties. According to an embodiment, the service server 300 may provide information for generating a plan corresponding to the received voice input to the intelligent server 200. The provided information may be stored in, for example, the capsule database 230. Further, the service server 300 may provide result information of the plan to the intelligent server 200.

In the integrated intelligence system 10, the user terminal 100 may provide various intelligent services to the user in response to user input. The user input may include, for example, input through a physical button, touch input, or voice input.

According to an embodiment, the user terminal 100 may provide a voice recognition service through an intelligent app (or a voice recognition app) stored therein. In this case, for example, the user terminal 100 may recognize a user speech (utterance) or a voice input received through the microphone and provide a service corresponding to the recognized voice input to the user.

According to an embodiment, the user terminal 100 may perform a predetermined operation alone or together with the intelligent server and/or the service server based on the received voice input. For example, the user terminal 100 may execute an app corresponding to the received voice input and perform a predetermined operation through the executed app.

According to an embodiment, when the user terminal 100 provides a service together with the intelligent server 200 and/or the service server 300, the user terminal may detect a user utterance through the microphone 120 and generate a signal (or voice data) corresponding to the detected user utterance. The user terminal may transmit the voice data to the intelligent server 200 through the communication interface 110.

According to an embodiment, the intelligent server 200 may generate a plan for performing a task corresponding to the voice input or the result of the operation according to the plan in response to the voice input received from the user terminal 100. The plan may include, for example, a plurality of operations for performing a task corresponding to the voice input of the user and a plurality of concepts related to the plurality of operations. The concepts may be parameters input for execution of the plurality of operations or may be defined for result values output due to the execution of the plurality of operations. The plan may include the relationship between the plurality of operations and the plurality of concepts.

According to an embodiment, the user terminal 100 may receive the response through the communication interface 110. The user terminal 100 may output a voice signal generated within the user terminal 100 to the outside through the speaker 130, or may output an image generated within the user terminal to the outside through the display 140.

Figure 2:
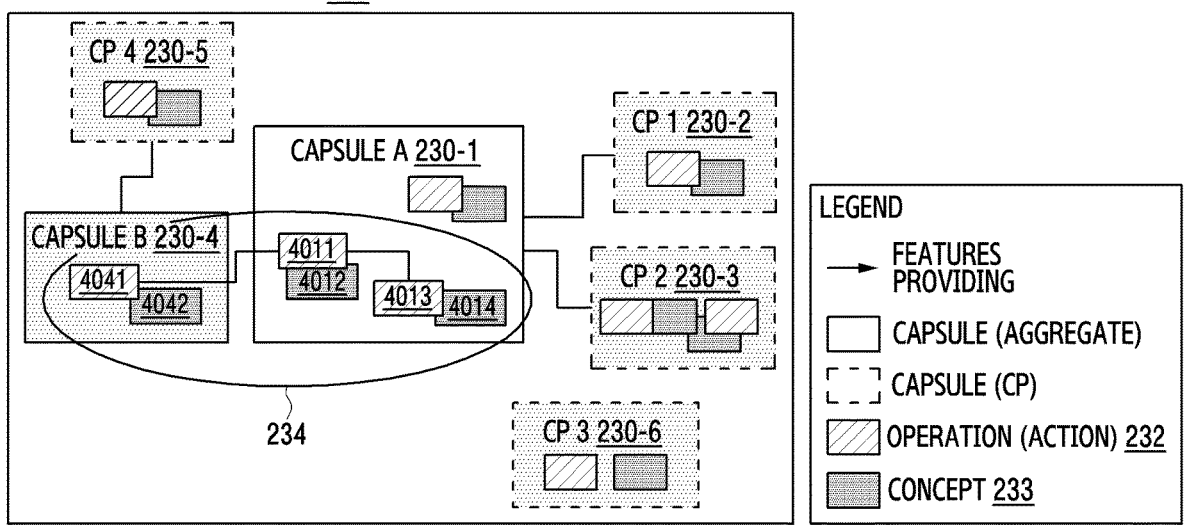
FIG. 2 is a diagram illustrating an example form in which relationship information between a concept and an action is stored in a database according to an embodiment.

FIG. 2 is a diagram illustrating an example form of relationship information between concepts and operations stored in a database according to various embodiments.

A capsule database (for example, the capsule database 230) of the intelligent server 200 may store a plurality of capsules in the form of, for example, a Concept Action Network (CAN). The capsule database may store an operation for processing a task corresponding to a user voice input and a parameter required for the operation in the form of a Concept Action Network (CAN) 231. The CAN 231 may indicate the organic relationship between the operation (action) and a concept defining a parameter required for performing the operation.

The capsule database may store a plurality of capsules (capsule A 230-1 and capsule B 230-4) corresponding to a plurality of domains (for example, applications). According to an embodiment, one capsule (for example, capsule A 230-1) may correspond to one domain (for example, application). Further, one capsule may correspond to at least one service provider (for example, CP #1 230-2, CP #2 230-3, CP #3 230-6, or CP #4 250-5) for performing a function of a domain related to the capsule. According to an embodiment, one capsule may include one or more operations 232 for performing a predetermined function and one or more concepts 233.

According to an embodiment, the natural language platform 220 may generate a plan for performing a task corresponding to a received voice input through the capsule stored in the capsule database. For example, the planner module 225 of the natural language platform may generate a plan through capsules stored in the capsule database. For example, a plan 234 may be generated using operations 4011 and 4013 and concepts 4012 and 4014 of capsule A 230-1 and an operation 4041 and a concept 4042 of capsule B 230-4.

Figure 3:
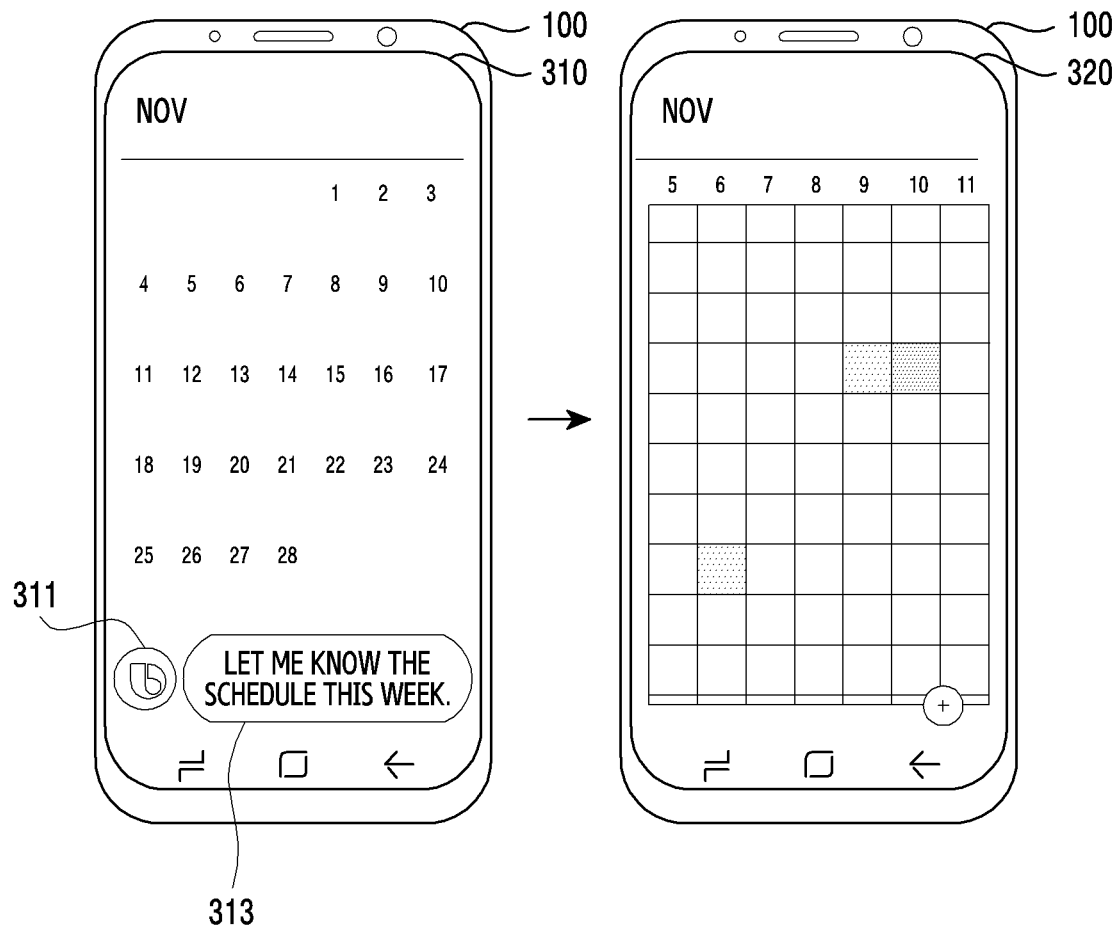
FIG. 3 is a diagram illustrating an example user terminal displaying a screen for processing a voice input received through an intelligent app according to an embodiment.

FIG. 3 is a diagram illustrating example screens on which a user terminal processes a received voice input through an intelligent app according to various embodiments.

The user terminal 100 may execute an intelligent app in order to process a user input through the intelligent server 200.

According to an embodiment, in a screen 310, when recognizing a predetermined voice input (for example, "Wake up!") or receiving an input through a hardware key (for example, a dedicated hardware key), the user terminal 100 may execute an intelligent app for processing the voice input. The user terminal 100 may execute the intelligent app in the state in which, for example, a schedule app is executed. According to an embodiment, the user terminal 100 may display an object 311 (for example, an icon) corresponding to the intelligent app on a screen 310 of the display 140. According to an embodiment, the user terminal 100 may receive the voice input through user speech. For example, the user terminal 100 may receive a voice input "Let me know the schedule this week". According to an embodiment, the user terminal 100 may display a User Interface (UI) 313 (for example, an input window) of the intelligent app displaying text data of the received voice input on the display.

According to an embodiment, in a screen 320, the user terminal 100 may display the result corresponding to the received voice input on the display. For example, the user terminal 100 may receive a plan corresponding to the received user input and display "this week's schedule" on the display according to the plan.

Figure 4:
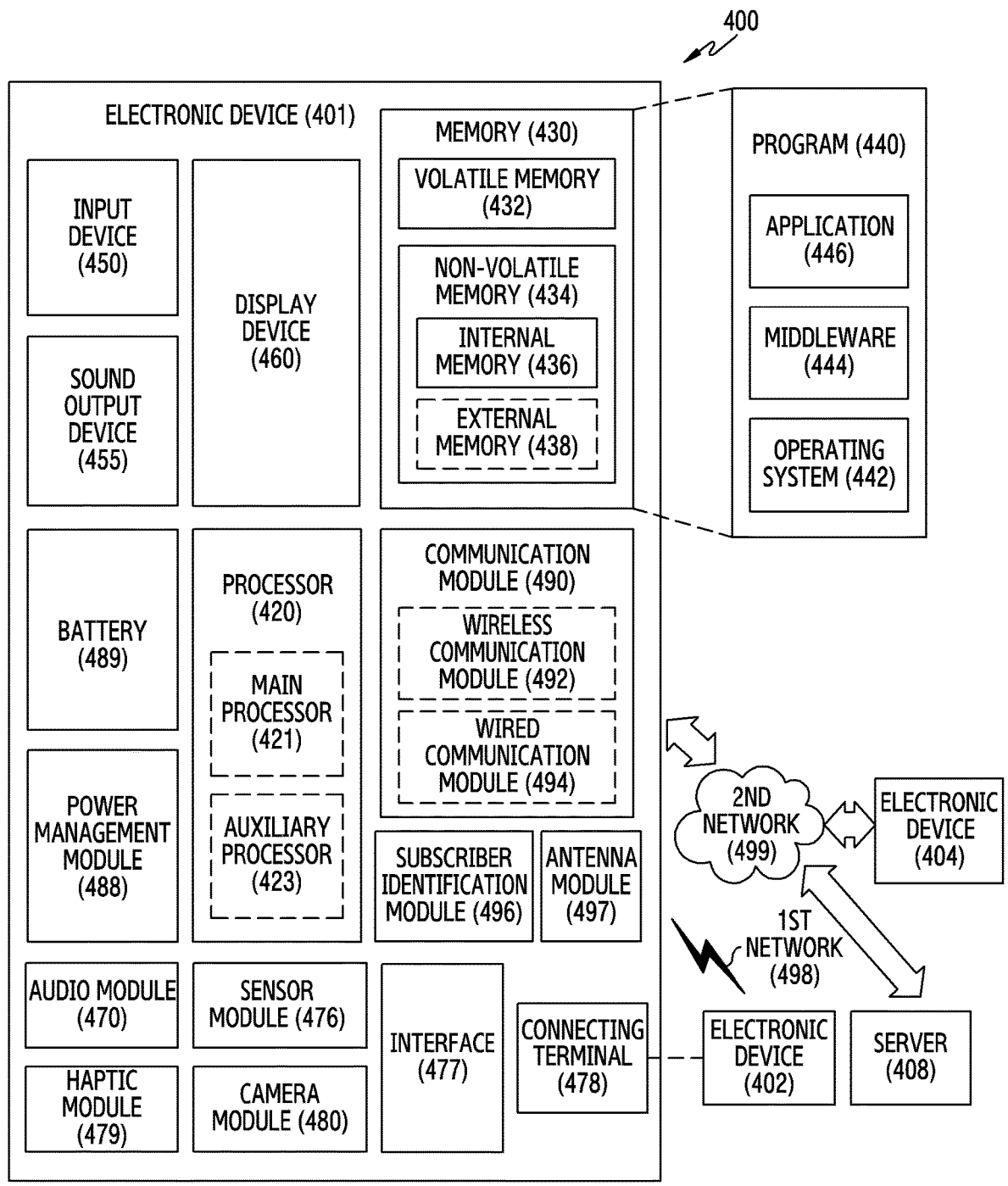
FIG. 4 is a block diagram illustrating an example electronic device within a network environment according to various embodiments.

FIG. 4 is a block diagram illustrating an electronic device 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, and/or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to an example embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an example embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
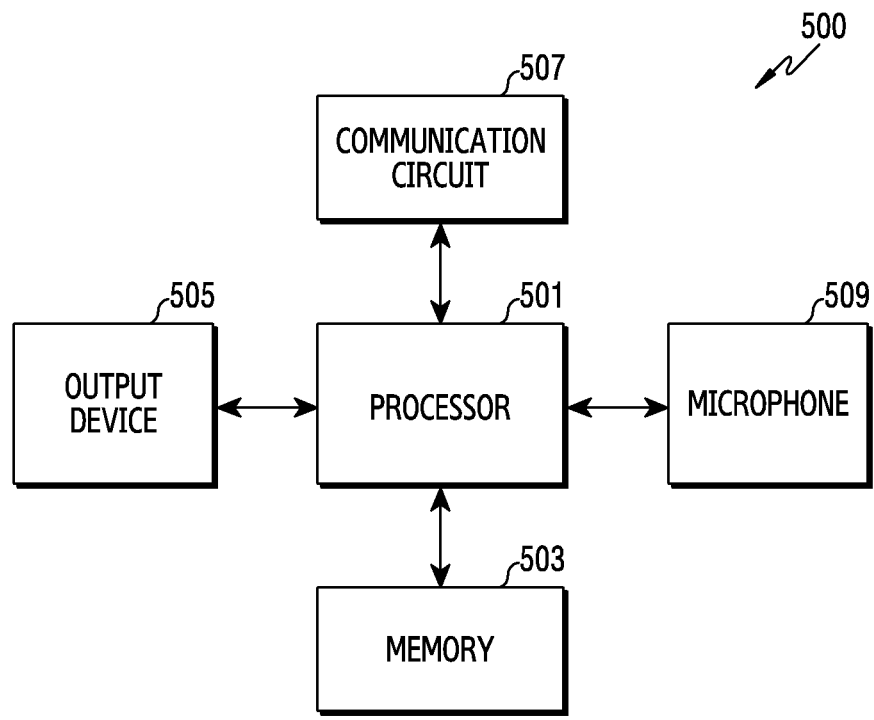
FIG. 5 is a block diagram illustrating an example electronic device according to various embodiments.

FIG. 5 is a block diagram of the electronic device according to various embodiments;

Referring to FIG. 5, an electronic device 500 (for example, the user terminal 100 of FIG. 1 or an electronic device 401 of FIG. 4) may include a processor (e.g., including processing circuitry) 501 (for example, the processor 160 of FIG. 1 or a processor 420 of FIG. 4), a memory 503 (for example, the memory 150 of FIG. 1 or a memory 430 of FIG. 4), an output device (e.g., including output circuitry) 505 (for example, the display 140 of FIG. 1, the speaker 130 of FIG. 1, a display device 460 of FIG. 4, and/or a sound output device 455 of FIG. 4), a communication circuit 507 (for example, the communication interface 110 of FIG. 1 or the communication module 490 of FIG. 4), and/or a microphone 509 (for example, the microphone 120 of FIG. 1 or an input device 450 of FIG. 4).

The processor 501 may include various processing circuitry and control the overall operation of the electronic device 500. The processor 501 may be operatively connected to other elements (components) within the electronic device 500, such as the memory 503, the output device 505, the communication circuit 507, and the microphone 509 for controlling the overall operation of the electronic device 500.

The processor 501 may receive commands of other elements, analyze the received commands, and perform calculations or process data according to the analyzed commands.

The processor 501 may process data or signals generated within the electronic device 500. For example, the processor 501 may make a request for an instruction, data, or a signal to the memory 503. The processor 501 may record (or store) or update the instruction, data, or signal within the memory 503 in order to control the electronic device 500 or other elements within the electronic device 500

The processor 501 may include at least one processor (e.g., may include one or more than one processor). For example, the processor 501 may include one or more of an application processor for controlling a program in a higher layer such as an application, a communication processor for controlling a function such as communication, or an audio codec chip for controlling encoding and decoding related to an audio signal.

The processor 501 may analyze and process a message, data, an instruction, or a signal received from the memory 503, the output device 505, the communication circuit 507, or the microphone 509. The processor 501 may generate a new message, data, instruction, or signal based on the received message, data, instruction, or signal. The processor 501 may provide the processed or generated message, data, instruction, or signal to the memory 503, the output device 505, the communication circuit 507, or the microphone 509.

The memory 503 may store an instruction, a control instruction code, control information, or user data for controlling the electronic device 500. For example, the memory 503 may store one or more of an application, an operating system, middleware, or a device driver.

The output device 505 may include various output circuitry and be used to provide information to the user. For example, the output device 505 may include one or more of a speaker for providing information to the user through an audio signal or a display for providing information to the user through a Graphic User Interface (GUI). The output device 505 may provide information to the user based on a signal or data provided from the processor 501.

The communication circuit 507 may be used to establish a communication path between the electronic device 500 and another electronic device (for example, the intelligent server 200 of FIG. 1, the electronic device 402 or 404 of FIG. 4, or the server 408 of FIG. 4). For example, the communication circuit 507 may be a module for at least one of a Bluetooth communication scheme, a Bluetooth Low Energy (BLE) communication scheme, a Wi-Fi communication scheme, a cellular (or mobile) communication scheme, or a wired communication scheme. The communication circuit 507 may provide a signal, data, or message received from another electronic device to the processor 501. The communication circuit 507 may transmit a signal, data, or message provided from the processor 501 to another electronic device.

The microphone 509 may receive an audio signal generated outside the electronic device 500. The microphone 509 may receive a voice signal such as a user-uttered input generated by the user of the electronic device 500. The microphone 509 may convert the received audio signal into an electrical signal. The microphone 509 may provide the converted electrical signal to the processor 501.

According to various embodiments, the processor 501 may detect a predetermined event through an application. For example, when an incoming call screen indicating that a call connection request is received from another electronic device (for example, the electronic device 404 of FIG. 4) is displayed through a call application, the processor 501 may determine that a predetermined event is detected. In another example, when a notification indicating that a text message is received is displayed through a message application (or when a text message is received), the processor 501 may determine that a predetermined event is detected. In another example, when a notification received from a server (for example, the server 408 of FIG. 4) is displayed through a Social Network Service (SNS) application, the processor 501 may determine that a predetermined event is detected. According to an embodiment, information related to a predetermined event may include at least one piece of information related to an intent corresponding to the predetermined event, information on the generation of a user interface (for example, the type of the user interface and/or information related to at least one object included in the user interface), or identification information of the electronic device 500. According to an embodiment, information related to a predetermined event may include at least one piece of information on an application, information on a capsule corresponding to an application, information related to a function of an application, information on the generation of a user interface (for example, a type of the user interface and/or information related to at least one object included in the user interface), or identification information of the electronic device 500. According to an embodiment, the processor 501 may detect a predetermined event through an application only when an operation mode of the electronic device 500 corresponds to a predetermined mode (for example, a hands-free mode, an eyes-free mode, or a vehicle mode). According to an embodiment, the processor may detect a predetermined event through an application regardless of the operation mode of the electronic device. According to an embodiment, the predetermined event may be information preset in an application by an application developer or information set and changed by input of a user installing an application.

According to various embodiments, the processor 501 may receive information related to a user interface from a server (for example, the intelligent server 200 of FIG. 1) through the communication circuit 507. When information related to the user interface is received, the processor 501 may display the user interface based on information related to the user interface received through the output device 505. For example, when information related to the user interface is received, the processor 501 may display the user interface in at least a portion of an execution screen of the application in the form of a popup window, or may display the user interface such that it overlaps at least a portion of the execution screen of the application. According to an embodiment, the user interface displayed through the output device 505 may include at least one visual object which can be selected by the user in order to control a function of the application.

According to various embodiments, when a user-uttered input for selecting one of at least one visual object included in the user interface is received through the microphone 509, the processor 501 may transmit information related to the user-uttered input to the server (for example, the intelligent server 200 of FIG. 1) through the communication circuit 57 in order to analyze a function corresponding to the user-uttered input. When a control signal corresponding to the user-uttered input is received from the server, the processor 501 may control the function of the application based on the control signal. According to an embodiment, when the user-uttered input is received through the microphone 509 after the function of the application is controlled based on the control signal, the processor 501 may transmit information related to the received user-uttered input to the server through the communication circuit 507 and receive the control signal corresponding to the user-uttered input from the server so as to continuously provide the function corresponding to the user-uttered input.

According to various embodiments, when user input for selecting at least one visual object included in the user interface is received through a display or a button, the processor 501 may transmit information related to the user input to the server through the communication circuit 507 in order to analyze the function corresponding to the user input. When the control signal corresponding to the user input is received from the server, the processor 501 may control the function of the application based on the control signal. According to an embodiment, when the user input is received through the display or the button after the function of the application is controlled based on the control signal, the processor 501 may transmit information related to the received user input to the server through the communication circuit 507 and receive the control signal corresponding to the user input from the server so as to continuously provide the function corresponding to the user input.

Figure 6:
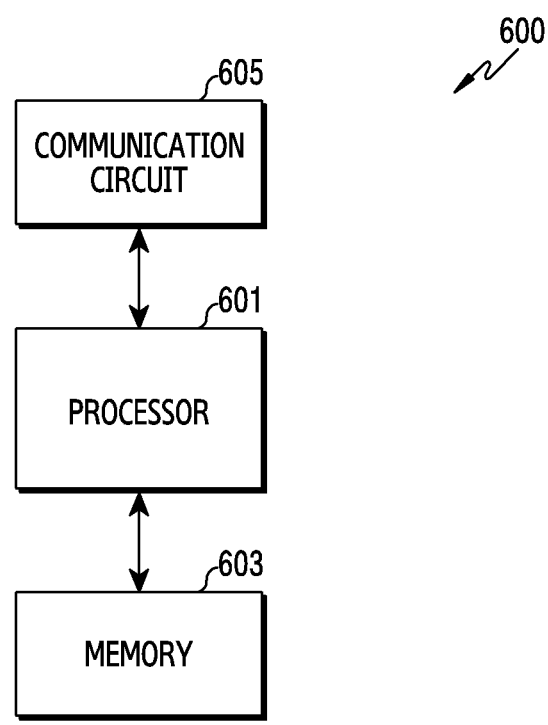
FIG. 6 is a block diagram illustrating an example server according to various embodiments.

FIG. 6 is a block diagram illustrating an example server according to various embodiments.

Referring to FIG. 6, a server 600 (for example, the intelligent server 200 of FIG. 1) may include a processor (e.g., including processing circuitry) 601, a memory 603, and/or a communication circuit 605.

The processor 601 may include various processing circuitry and control the overall operation of the server 600. The processor 601 may be operatively connected to other elements within the server 600 such as the memory 603 and the communication circuit 605 in order to control the overall operation of the server 600.

The processor 601 may receive commands of other elements of the server 600, analyze the received commands, and perform calculations or process data according to the analyzed commands.

The processor 601 may process data or signals generated within the server 600. For example, the processor 601 may make a request for an instruction, data, or a signal to the memory 603. The processor 601 may record (or store) or update an instruction, data, or a signal in the memory 603 in order to control the server 600 or other elements within the server 600.

The processor 601 may analyze or process the instruction, data, or signal received from the memory 603 or the communication circuit 605. The processor 601 may generate new data or a new instruction or signal based on the received data or signal. The processor 601 may provide the processed or generated data, instruction, or signal to the memory 603 or the communication circuit 605.

The memory 603 may store an instruction, a control instruction code, control information, or user data for controlling the server 600. For example, the memory 603 may include an application, an operating system, middleware, and a device driver.

The communication circuit 605 may be used to establish a communication path between the server 600 and another electronic device (for example, the user terminal 100 of FIG. 1, the service server 300 of FIG. 1, the electronic device 401 of FIG. 4, or the electronic device 500 of FIG. 5). For example, the communication circuit 605 may be a module for at least one of a Wi-Fi communication scheme, a cellular (or mobile) communication scheme, or a wired communication scheme. The communication circuit 605 may provide a signal, data, or message received from another electronic device to the processor 601. The communication circuit 605 may transmit a signal, data, or message provided from the processor 601 to another electronic device.

According to various embodiments, the memory 603 may store data for providing a voice recognition service. For example, the memory 603 may include at least one piece of intent information for providing a function corresponding to an intent of a predetermined event, a user utterance, or a user input, entity analysis information for analyzing and extracting entities within predetermined information, a user utterance, or a user input, and context information for analyzing the context of a user utterance or a user input in order to provide the voice recognition service. In another example, the memory 603 may store at least one capsule for providing the voice recognition service. According to an embodiment, a capsule corresponding to an application among at least one capsule stored in the memory may be data provided to the server 600 from another server (for example, the service server 300 of FIG. 1) for servicing the application and may include information related to a function (or an action) of an application serviced by the other server. According to an embodiment, a common capsule (for example, a generic capsule or a predefined capsule) among at least one capsule stored in the memory is data provided from the server 600, and may include information related to a function (or an action) that can be commonly used by various applications.

According to various embodiments, the processor 601 may receive information related to a predetermined event from another electronic device (for example, the user terminal 100 of FIG. 1, the service server 300 of FIG. 1, the electronic device 401 of FIG. 4, or the electronic device 500 of FIG. 5). According to an embodiment, information on a predetermined event may include at least one piece of information related to an intent corresponding to the predetermined event, information on the generation of a user interface (for example, a type of the user interface and/or information related to at least one object included in the user interface), identification information of the electronic device, or identification information of the electronic device in which an application is installed. According to an embodiment, information on a predetermined event may include at least one piece of information on an application corresponding to the predetermined event, information on a capsule corresponding to an application, information related to a function of an application, information on the generation of a user interface (for example, the type of the user interface and/or information related to at least one object included in the user interface), identification information of the electronic device, or identification information of the electronic device in which an application is installed.

According to various embodiments, the processor 601 may generate a user interface based on information related to a predetermined event. For example, the processor 601 may identify an intent corresponding to a predetermined event based on information related to the predetermined event, determine a function corresponding to the intent based on the intent information, and generate a user interface based on the determined function. In another example, the processor 601 may identify an application corresponding to a predetermined event based on information related to the predetermined event, determine a capsule corresponding to the identified application, and generate a user interface based on the determined capsule. The generated user interface may include at least one visual object for controlling a function of an application corresponding to the predetermined event.

According to various embodiments, when the user interface is generated, the processor 601 may transmit information related to the user interface to another electronic device through the communication circuit 605. For example, when information related to the predetermined event is received from the electronic device (for example, the user terminal 100 of FIG. 1 or the electronic device 404 of FIG. 4), the processor 601 may transmit information related to the user interface to the electronic device through the communication circuit 605. In another example, when information related to the predetermined event is received from another server (for example, the service server 300 of FIG. 1), the processor 601 may acquire identification information of the electronic device in which an application corresponding to the predetermined event is installed from the information related to the predetermined event and transmit the information related to the user interface to the electronic device to which the application corresponding to the predetermined event is installed through the communication circuit 605 based on the acquired identification information. According to an embodiment, when the number of electronic devices to which the application corresponding to the predetermined event is installed is plural, the processor 601 may provide the information related to the user interface to each of the plurality of electronic devices through the communication circuit 605.

According to various embodiments, when information related to a user-uttered input for at least one visual object included in the user interface is received from the electronic device through the communication circuit 605, the processor 601 may generate a control signal for performing a function of an application corresponding to the visual object selected by the user-uttered input. For example, the processor 601 may convert information related to the user-uttered input (for example, a voice signal) received from the electronic device into text data and identify a visual object selected by a user-uttered input by analyzing the converted text data, so as to identify the visual object selected by the user-uttered input and generate a control signal for performing the function of an application corresponding to the identified visual object. When the control signal is generated, the processor 601 may transmit the control signal to the electronic device through the communication circuit 605.

An electronic device (for example, the user terminal 100 of FIG. 1, the electronic device 401 of FIG. 4, or the electronic device 500 of FIG. 5) according to various example embodiments may include a communication circuit (for example, the communication interface 110 of FIG. 1, the communication module 490 of FIG. 4, or the communication circuit 507 of FIG. 5), a display (for example, the display 140 of FIG. 1, the display device 460 of FIG. 4, or the output device 505 of FIG. 5), a microphone (for example, the microphone 120 of FIG. 1, the input device 450 of FIG. 4, or the microphone 509 of FIG. 5), a processor (for example, the processor 160 of FIG. 1, the processor 420 of FIG. 4, or the processor 501 of FIG. 5) operatively connected to the communication circuit, the display, and the microphone, and a memory (for example, the memory 150 of FIG. 1, the memory 430 of FIG. 4, or the memory 503 of FIG. 5) operatively connected to the processor, wherein the memory stores instructions which, when executed, cause the processor to control the electronic device to: transmit information related to a predetermined event to a server (for example, the intelligent server 200 of FIG. 1 or the server 600 of FIG. 6) through the communication circuit in response to detection of the predetermined event through an application, display a user interface through the display in response to reception of information related to the user interface including at least one visual object selectable by a user to control a function of the application through the communication circuit, receive a user-uttered input for selecting one of the at least one visual object included in the user interface through the microphone, and transmit information related to the user-uttered input to the server through the communication circuit to perform a function corresponding to the visual object selected by the user-uttered input.

According to various example embodiments, the instructions, when executed, may cause the processor to control the electronic device to receive a control signal for performing a function of an application corresponding to the visual object selected by the user-uttered input from the server through the communication circuit and perform the function of the application corresponding to the visual object selected by the user-uttered input.

According to various example embodiments, the information related to the predetermined event may include at least one piece of information on an application corresponding to the predetermined event, information related to a function of the application, information on generation of the user interface, or identification information of the electronic device.

According to various example embodiments, the information related to the predetermined event may include at least one piece of information related to an intent corresponding to the predetermined event, information on generation of the user interface, or identification information of the electronic device.

According to various example embodiments, the instructions, when executed, may cause the processor to control the electronic device to identify a preference for the application in response to detection of the predetermined event, determine whether the preference for the application is greater than a reference value, and based on the preference for the application being greater than the reference value, transmit the information related to the predetermined event to the server through the communication circuit.

According to various example embodiments, the instructions, when executed, may cause the processor to control the electronic device to limit transmission of the information related to the predetermined event based on the preference for the application not being greater than the reference value.

According to various example embodiments, the instructions, when executed, may cause the processor to control the electronic device to control the preference for the application based on the use time of the application, a use frequency, or the user-uttered input.

According to various example embodiments, the instructions, when executed, may cause the processor to control the electronic device to limit transmission of the information related to the predetermined event based on the electronic device not operating in a predetermined mode.

A server (for example, the intelligent server 200 of FIG. 1 or the server 600 of FIG. 6) according to various example embodiments may include a communication circuit (for example, the communication circuit 605 of FIG. 6), a processor (for example, the processor 603 of FIG. 6) operatively connected to the communication circuit, and a memory (for example, the memory 603 of FIG. 6) operatively connected to the processor, wherein the memory stores instructions which, when executed, cause the processor to control the server to: receive information related to a predetermined event from an electronic device (for example, the user terminal 100 of FIG. 1, the electronic device 401 of FIG. 4, or the electronic device 500 of FIG. 5) through the communication circuit, generate a user interface including at least one visual object selectable by a user to control a function of an application corresponding to the predetermined event based on the information related to the predetermined event, transmit information related to the user interface to the electronic device through the communication circuit, receive information related to a user-uttered input for selecting one of the at least one visual object included in the user interface from the electronic device through the communication circuit, and transmit a control signal for performing a function of an application corresponding to the visual object selected by the user-uttered input to the electronic device through the communication circuit based on the information related to the user-uttered input.

According to various example embodiments, the information related to the predetermined event may include at least one piece of information on an application corresponding to the predetermined event, information related to a function of the application, information on generation of the user interface, or identification information of the electronic device.

According to various example embodiments, the instructions, when executed, may cause the processor to control the server to select an application corresponding to a predetermined event, among at least one application stored in the memory based on the information related to the predetermined event and generate the user interface based on the selected application.

According to various example embodiments, the information related to the predetermined event may include at least one piece of information related to an intent corresponding to the predetermined event, information on generation of the user interface, or identification information of the electronic device.

According to various example embodiments, the instructions, when executed, may cause the processor to control the server to identify an intent corresponding to the predetermined event based on the information related to the predetermined event, determine a function corresponding to the intent based on intent information stored in the memory, and generate the user interface based on the determined function.

According to various example embodiments, the instructions, when executed, may cause the processor to control the server to identify a preference for the application in response to reception of the information related to the predetermined event from the electronic device, determine whether the preference for the application is greater than a reference value, and generate the user interface based on the preference for the application being greater than the reference value.

According to various example embodiments, the instructions, when executed, may cause the processor to control the server to restrict generation associated with the predetermined event based on the preference for the application being equal to or less than the reference value.

A server (for example, the intelligent server 200 of FIG. 1 or the server 600 of FIG. 6) according to various example embodiments may include a communication circuit (for example, the communication circuit 605 of FIG. 6), a processor (for example, the processor 603 of FIG. 6) operatively connected to the communication circuit, and a memory (for example, the memory 603 of FIG. 6) operatively connected to the processor, wherein the memory stores instructions which, when executed, cause the processor to control the server to: receive information related to a predetermined event from another server through the communication circuit, identify an electronic device (for example, the user terminal 100 of FIG. 1, the electronic device 401 of FIG. 4, or the electronic device 500 of FIG. 5) to which an application corresponding to the predetermined event is installed, generate a user interface including at least one visual object selected by a user to control a function of the application corresponding to the predetermined event based on the information related to the predetermined event, transmit information related to the user interface to the electronic device through the communication circuit, receive information related to a user-uttered input for selecting one of the at least one visual object included in the user interface from the electronic device through the communication circuit, and transmit a control signal for performing a function corresponding to the visual object selected by the user-uttered input to the electronic device through the communication circuit based on the information related to the user-uttered input.

According to various example embodiments, the information related to the predetermined event may include at least one piece of information on an application corresponding to the predetermined event, information related to a function of the application, information on generation of the user interface, identification information of the electronic device, or identification information of the electronic device to which the application is installed.

According to various example embodiments, the instructions, when executed, may cause the processor to control the server to select an application corresponding to a predetermined event, among at least one application stored in the memory based on the information related to the predetermined event and generate the user interface based on the selected application.

According to various example embodiments, the information related to the predetermined event may include at least one piece of information related to an intent corresponding to the predetermined event, information on generation of the user interface, identification information of the electronic device, or identification information of the electronic device to which the application is installed.

According to various example embodiments, the instructions, when executed, may cause the processor to control the server to identify an intent corresponding to the predetermined event based on the information related to the predetermined event, determine a function corresponding to the intent based on intent information stored in the memory, and generate the user interface based on the determined function.

Figure 7:
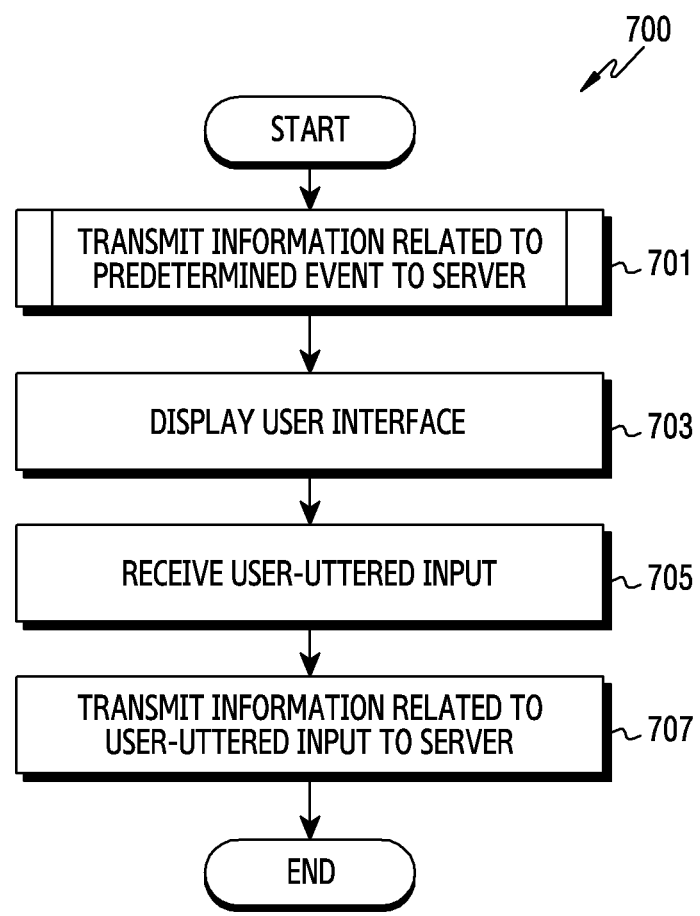
FIG. 7 is a flowchart illustrating an example method by which an electronic device provides a voice recognition service according to various embodiments.
Figure 8A:
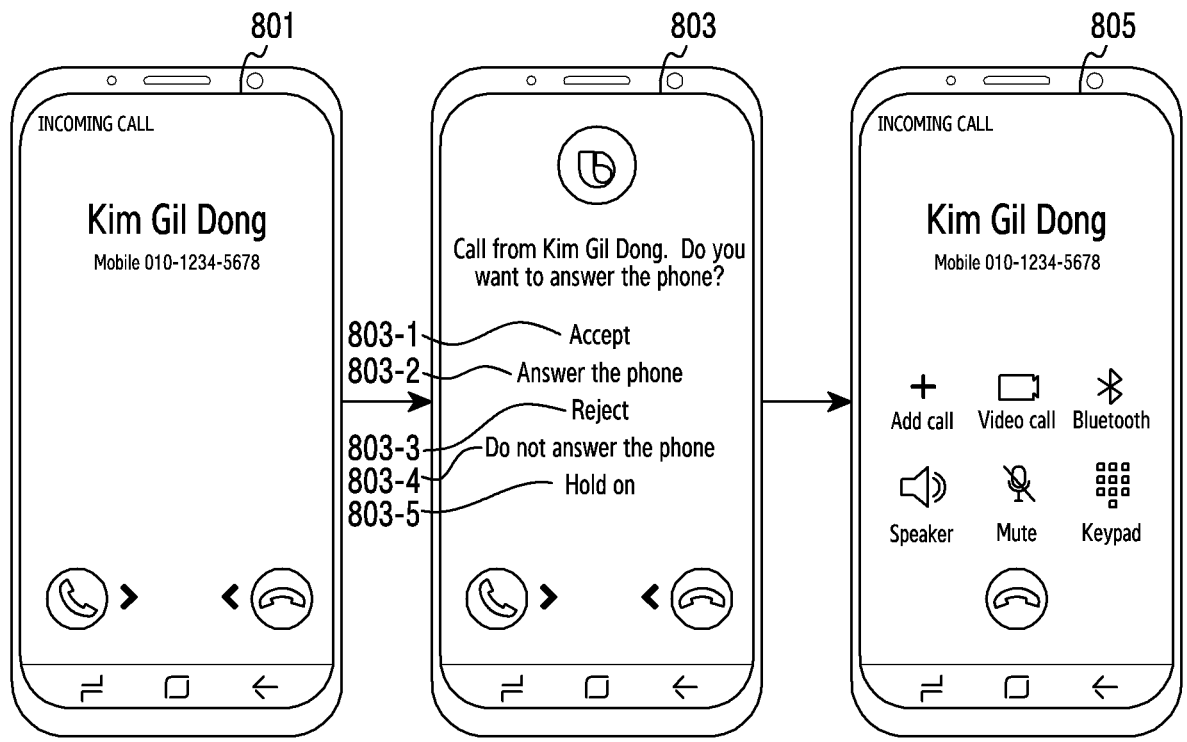
FIG. 8A is a diagram illustrating an example of a user interface provided to a user by an electronic device according to various embodiments.

FIG. 7 is a flowchart 700 illustrating an example method by which an electronic device provides a voice recognition service according to various embodiments. FIG. 8A is a diagram illustrating an example user interface provided to a user by an electronic device according to various embodiments, and FIG. 8B is a diagram illustrating an example user interface provided to a user by an electronic device according to various embodiments.

Figure 8B:
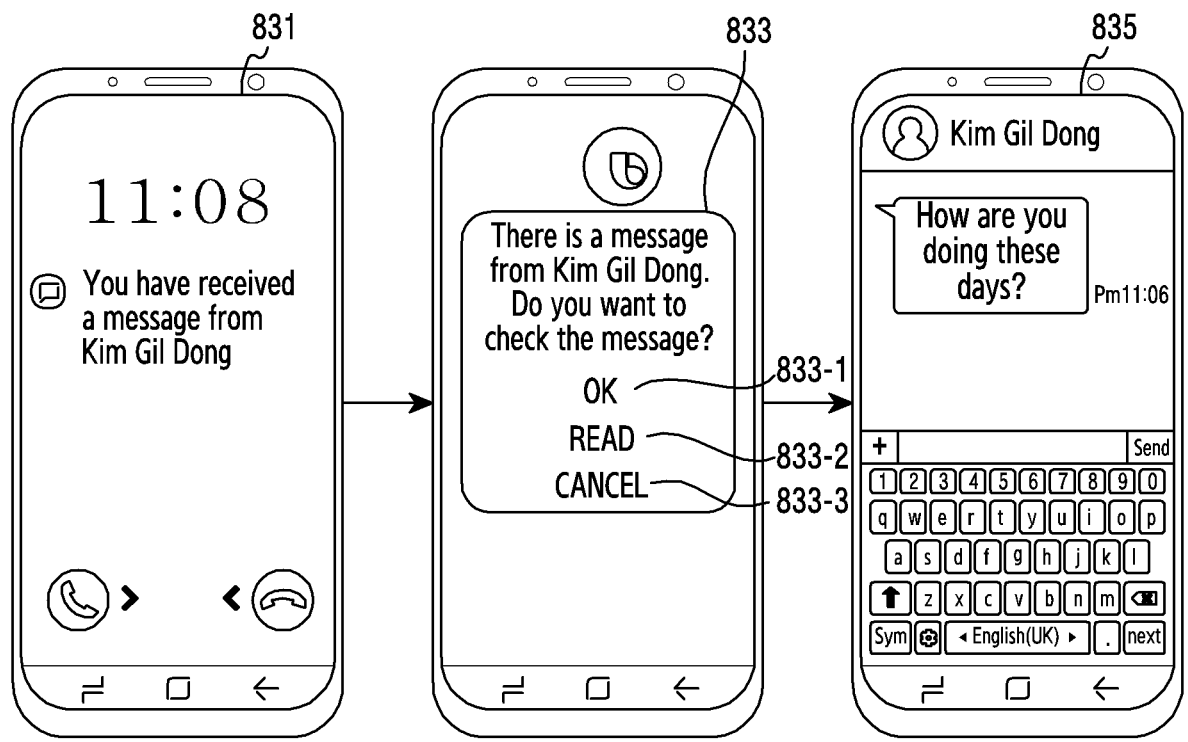
FIG. 8B is a diagram illustrating an example of a user interface provided to a user by an electronic device according to various embodiments.

Referring to FIGS. 7, 8A, and 8B, in operation 701, a processor (for example, the processor 160 of FIG. 1, the processor 420 of FIG. 4, or the processor 501 of FIG. 5) of an electronic device (for example, the user terminal 100 of FIG. 1, the electronic device 401 of FIG. 4, or the electronic device 500 of FIG. 5) may transmit information related to a predetermined event to a server (for example, the intelligent server 200 of FIG. 1 or the server 600 of FIG. 6) through a communication circuit (for example, the communication interface 110 of FIG. 1, the communication module 490 of FIG. 4, or the communication circuit 507 of FIG. 5) in response to detection of the predetermined event through an application. When an incoming call screen 801 indicating that a call connection request is received from another electronic device (for example, the electronic device 404 of FIG. 4) is displayed through a call application, as illustrated in FIG. 8A, the processor may determine that a predetermined event is detected. In another example, when a notification screen 831 indicating that a text message is received is displayed through a message application, as illustrated in FIG. 8B, the processor may determine that a predetermined event is detected. In another example, when a notification screen received from a server (for example, the server 408 of FIG. 4) is displayed through an SNS application, the processor may determine that a predetermined event is detected. According to an embodiment, the processor may detect a predetermined event through an application when an operation mode of the electronic device 500 corresponds to a predetermined mode (for example, a hands-free mode, an eyes-free mode, or a vehicle mode). According to an embodiment, the processor may detect a predetermined event through an application regardless of the operation mode of the electronic device. According to an embodiment, the predetermined event may be information preset in an application by an application developer or information set and changed by input of a user installing an application. When a predetermined event is detected, the processor may transmit information related to the predetermined event to the server so that the server generates a communication circuit to generate a user interface for a voice recognition service for controlling a function of the application. According to an embodiment, information related to a predetermined event may include at least one piece of information related to an intent corresponding to the predetermined event, information on the generation of a user interface (for example, a type of the user interface and/or information related to at least one object included in the user interface), or identification information of the electronic device. According to an embodiment, information on a predetermined event may include at least one piece of information on an application, information on a capsule corresponding to an application, information related to a function of an application, information on the generation of a user interface (for example, a type of the user interface and/or information related to at least one object included in the user interface), or identification information of the electronic device.

According to various embodiments, when a predetermined event is detected through an application, the processor may determine whether to transmit information related to the predetermined event to the server based on a preference for the application. For example, when a predetermined event is detected through an application, the processor may identify a preference for the application, and may transmit information related to the predetermined event to the server through the communication circuit only when the preference for the application is greater than a reference value. Accordingly, the electronic device may perform an operation for providing the voice recognition service only for applications in which the user is interested.

In operation 703, the processor may display a user interface through a display (for example, the display 140 of FIG. 1, the display device 460 of FIG. 4, or the output device 505 of FIG. 5) in response to reception of information on a user interface including at least one visual object that can be selected by the user in order to control a function of the application through the communication circuit. For example, the processor may display a user interface 803 including a plurality of voice commands 803-1, 803-2, 803-3, 803-4, 803-5 (which may be referred to hereinafter as 803-1 to 803-5) for controlling a function of a call application through the display, as illustrated in FIG. 8A. In another example, the processor may display a user interface 833 including a plurality of voice commands 833-1, 833-2, 833-3 (which may be referred to herein after as 833-1 to 833-3) for controlling a function of a message application through the display, as illustrated in FIG. 8B.

In operation 705, the processor may receive a user-uttered input for selecting one of at least one visual object included in the user interface through a microphone (for example, the microphone 120 of FIG. 1, the input device 450 of FIG. 4, or the microphone 509 of FIG. 5). For example, the processor may receive a user-uttered input for one of the plurality of voice commands 803-1 to 803-5 included in the user interface 803 through the microphone, as illustrated in FIG. 8A. In another example, the processor may receive a user-uttered input for one of the plurality of voice commands 833-1 to 833-3 included in the user interface 833 through the microphone, as illustrated in FIG. 8B.

In operation 707, the processor may transmit information related to a user-uttered input to the server through the communication circuit to perform a function of an application corresponding to the visual object selected by the user-uttered input. According to an embodiment, when a control signal for allowing the electronic device to perform the function of the application corresponding to the visual object selected by the user-uttered input is received from the server through the communication circuit, the processor may perform the function of the application corresponding to the visual object selected by the user-uttered input. For example, when a user-uttered input for the first voice command 803-1 or the second voice command 803-2 among the plurality of voice commands 803-1 to 803-5 is received as illustrated in FIG. 8A, the processor may receive a control signal for allowing the electronic device to perform a call connection from the server through the communication circuit, display a call screen 805 through a call application based on the received control signal, and perform the call connection. In another example, when a user-uttered input for the first voice command 833-1 among the plurality of voice commands 833-1 to 833-3 is received, as illustrated in FIG. 8B, the processor may receive a control signal for allowing the electronic device to display content of a received text message from the server through the communication circuit and display a screen 835 of the application for outputting the received text message based on the received control signal.

According to various embodiments, when an additional user-uttered input is received after the function of the application selected by the user-uttered input is performed based on the control signal, the electronic device may provide the voice recognition service according to the additional user-uttered input by performing operations 705 and 707 again.

Even if a predetermined input (for example, "Wake up!") for triggering the voice recognition service is not received, the electronic device according to various embodiments may provide the voice recognition service to the user based on a predetermined event and thus increase a likelihood that the user will use the voice recognition service.

According to various embodiments, when information related to a user interface is not received from the server within a predetermined time after information on a predetermined event is provided to the server, the electronic device may retransmit the information related to the predetermined event to the server or terminate the algorithm.

According to various embodiments, when a signal indicating that generation of the user interface is restricted is received from the server after information on a predetermined event is provided to the server, the electronic device may terminate the algorithm.

Although it has been described that the electronic device receives the user-uttered input for selecting one of at least one visual object included in the user interface through the microphone, the electronic device may receive the user input for selecting one of at least one visual object included in the user interface through the display or the button according to various embodiments of the disclosure.

Figure 9:
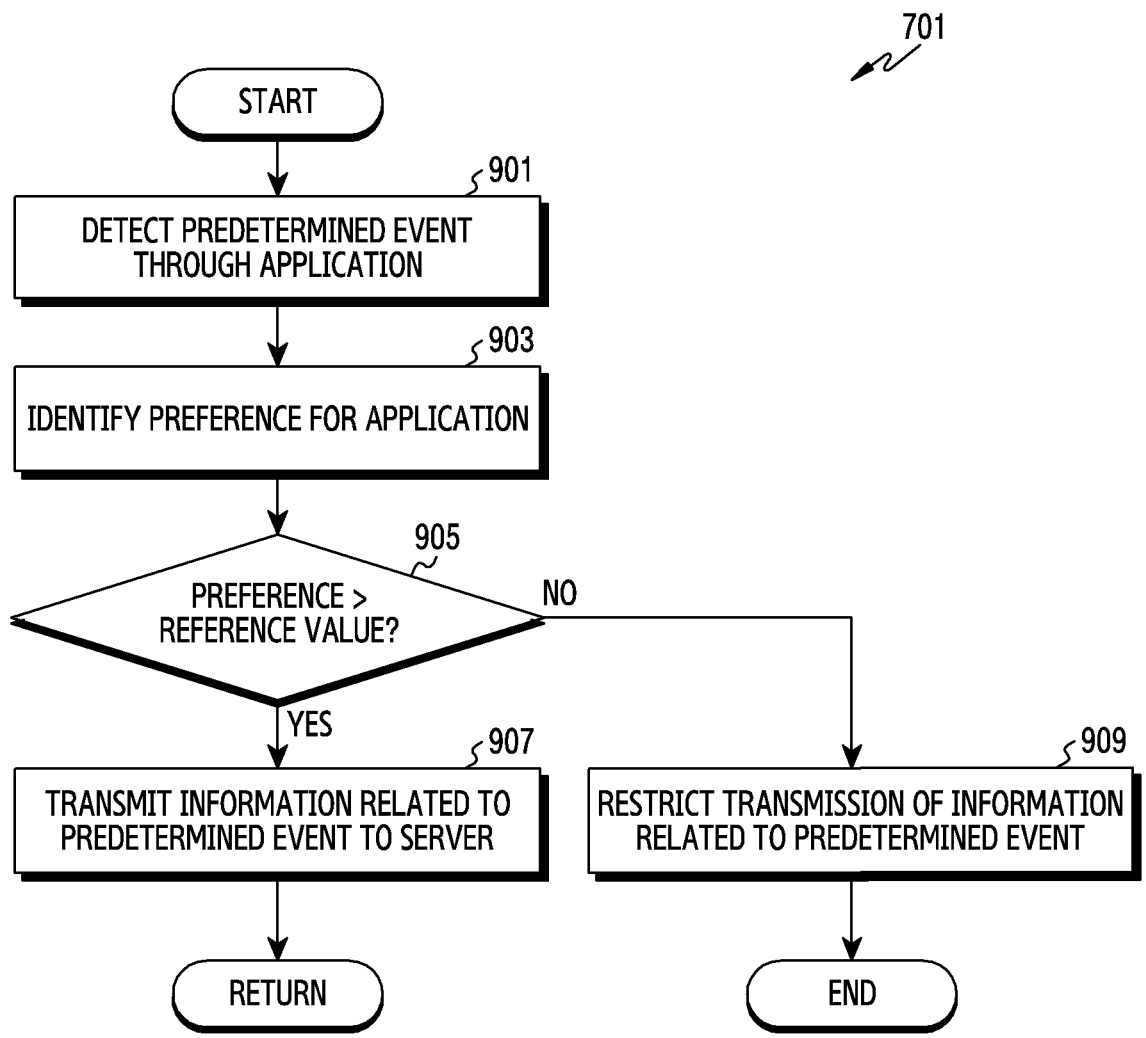
FIG. 9 is a flowchart illustrating an example method by which an electronic device transmits information related to a predetermined event to a server according to various embodiments.

FIG. 9 is a flowchart illustrating an example method by which an electronic device transmits information related to a predetermined event to a server according to various embodiments. The following description may correspond, for example, to a detailed operation of transmitting information related to a predetermined event to a server in operation 701 of FIG. 7.

Referring to FIG. 9, in operation 901, a processor (for example, the processor 160 of FIG. 1, the processor 420 of FIG. 4, or the processor 501 of FIG. 5) of an electronic device (for example, the user interface 100 of FIG. 1, the electronic device 401 of FIG. 4, or the electronic device 500 of FIG. 5) may detect a predetermined event through an application. For example, when an incoming call screen indicating that a call connection request is received from another electronic device (for example, the electronic device 404 of FIG. 4) is received is displayed through a call application, the processor may determine that a predetermined event is detected. In another example, when a notification screen indicating that a text message is received is displayed through a message application, the processor may determine that a predetermined event is detected. In another example, when a notification screen received from a server (for example, the server 408 of FIG. 4) is displayed through an SNS application, the processor may determine that a predetermined event is detected.

In operation 903, the processor may identify a preference for the application in response to detection of the predetermined event. According to an embodiment, the preference for the application may be configured as an initially predetermined value, and the processor may change the preference for the application based on a use time of the application, a use frequency, or a user-uttered input for a user interface for the voice recognition service. For example, the processor may record information on the use time or the use frequency for each application in a memory (for example, the memory 150 of FIG. 1, the memory 430 of FIG. 4, or the memory 503 of FIG. 5) and change the preference for each application based on the recorded information. The preference for the application may be changed to have a higher value as the use time or the use frequency is higher. In another example, when a user-uttered input for selecting at least one visual object included in a user interface is received after the user interface for controlling a function of the application through the voice recognition service is displayed, the processor may record information on the visual object selected by the user-uttered input in the memory and configure (or change) a preference for the application based on the recorded information. The preference for the application may be determined based on a preset value for each of at least one visual object included in the user interface. For example, a first value may be configured in a visual object (for example, the voice command 803-5 of FIG. 8A) requiring the voice recognition service and a second value, different from the first value, may be configured in a visual object (for example, the voice command 803-3) that does not require an additional voice recognition service, and the processor may control the preference for the application by adding a value corresponding to the visual object selected by the user-uttered input to the preference for the application.

In operation 905, the processor may determine whether the preference for the application is greater than a reference value. The reference value may be configured as the same value regardless of the application, or may be configured as a different value for each application. According to an embodiment, the reference value may be changed to another value based on user input or a signal received from the server. The processor may perform operation 907 when the preference for the application is greater than the reference value ("Yes" in operation 905), and may perform operation 909 when the preference for the application is equal to or less than the reference value ("No" in operation 905).

When the preference for the application is greater than the reference value, the processor may transmit information related to the predetermined event to a server (for example, the intelligent server 200 of FIG. 1) through the communication circuit in operation 907. For example, the processor may transmit at least one piece of information related to an intent corresponding to a predetermined event, information on the generation of a user interface (for example, a type of the user interface and/or information related to at least one object included in the user interface), identification information of the electronic device, or identification information of the electronic device in which an application is installed to the server through a communication circuit (for example, the communication interface 110 of FIG. 1, the communication module 490 of FIG. 4, or the communication circuit 507 of FIG. 5). In another example, the processor may transmit at least one piece of information on an application, information on a capsule corresponding to an application, information related to a function of an application, information on the generation of a user interface (for example, a type of the user interface and/or information related to at least one object included in the user interface), or identification information of the electronic device to the server through the communication circuit. Accordingly, the electronic device may receive information on the user interface for the voice recognition service for controlling the function of the application from the server and display the user interface for the voice recognition service based on the received information so as to provide the voice recognition service to the user even if a predetermined input (for example, "Wake up!") for triggering the voice recognition service is not received.

When the preference for the application is equal to or less than the reference value, the processor may limit (e.g., restrict) transmission of information on the predetermined event and terminate the algorithm in operation 909. Accordingly, the electronic device may limit the voice recognition service for applications that the user does not prefer.

Figure 10:
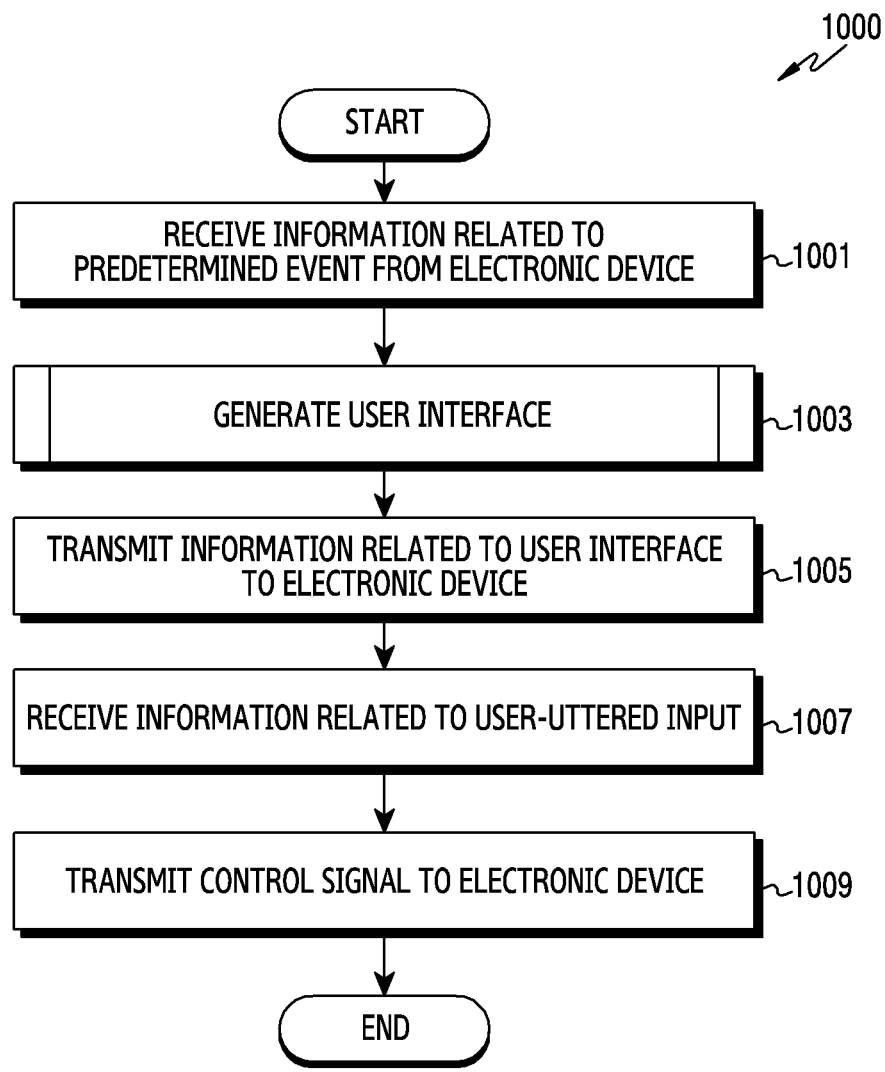
FIG. 10 is a flowchart illustrating an example method by which a server provides a voice recognition service according to various embodiments.

FIG. 10 is a flowchart 1000 illustrating an example method by which a server provides a voice recognition service according to various embodiments.

Referring to FIG. 10, in operation 1001, a processor (for example, the processor 601 of FIG. 6) of a server (for example, the intelligent server 200 of FIG. 1 or the server 600 of FIG. 6) may receive information on a predetermined event from an electronic device (for example, the user terminal 100 of FIG. 1, the electronic device 401 of FIG. 4, or the electronic device 500 of FIG. 5) through a communication circuit (for example, the communication circuit 605 of FIG. 6). For example, the processor may receive at least one piece of information related to an intent corresponding to a predetermined event, information on the generation of a user interface (for example, a type of the user interface and/or information related to at least one object included in the user interface), or identification information of the electronic device through a communication circuit. In another example, the processor may receive at least one piece of information on an application, information on a capsule corresponding to an application, information related to a function of an application, information on the generation of a user interface (for example, a type of the user interface and/or information related to at least one object included in the user interface), or identification information of the electronic device from the electronic device through a communication circuit.

In operation 1003, the processor may generate a user interface including at least one visual object that can be selected by the user in order to control a function of an application corresponding to the predetermined event based on information related to the predetermined event. For example, the processor may identify an intent corresponding to the predetermined event based on information related to the predetermined event, determine a function corresponding to the intent based on intent information stored in a memory (for example, the memory 603 of FIG. 6), and generate a user interface based on the determined function. In another example, the processor may identify an application corresponding to the predetermined event based on information related to the predetermined event, determine a capsule corresponding to the identified application among at least one capsule stored in a memory (for example, the capsule database 230 of FIG. 1 or the memory 603 of FIG. 6), and generate a user interface based on the determined capsule. According to an embodiment, when the capsule corresponding to the application is stored in the memory, the processor may generate a user interface based on a common capsule (for example, a generic capsule or a predefined capsule). According to an embodiment, the capsule corresponding to the application may be data provided from another server (for example, the service server of FIG. 1). According to an embodiment, the common capsule is data defining a function (or action) that can be used by various applications in common, and may be data provided by the server.

According to various embodiments, the processor may determine whether to generate a user interface based on a preference for the application corresponding to the predetermined event. For example, the processor may identify a preference for the application corresponding to the predetermined event and generate the user interface only when the identified preference for the application is greater than a reference value. Accordingly, the server may perform an operation for providing the voice recognition service only for applications in which the user of the electronic device detecting the predetermined event is interested.

In operation 1005, the processor may transmit information related to the user interface to the electronic device through the communication circuit in response to generation of the user interface. The electronic device receiving the information related to the user interface may display the user interface based on information received from the server. For example, the electronic device may display the user interface 803 including the plurality of voice commands 803-1 to 803-5 for controlling the function of a call application based on information related to the user interface as illustrated in FIG. 8A.

In operation 1007, the processor may receive information (for example, a voice signal) related to user-uttered input for selecting one of at least one visual object included in the user interface from the electronic device through the communication circuit.

In operation 1009, the processor may transmit a control signal for allowing the electronic device to perform the function of an application corresponding to the visual object selected by the user-uttered input through the communication circuit based on information related to the user-uttered input. For example, the processor may convert the information related to the user-uttered input received from the electronic device into text data and analyze the converted text data to identify the visual object selected by the user-uttered input, generate a control signal for performing the function of the application corresponding to the identified visual object, and transmit the generated control signal to the electronic device through the communication circuit.

When information related to the predetermined event is received from the electronic device, the server according to various embodiments may generate a user interface for the voice recognition service and provide the user interface to the electronic device so as to provide the voice recognition service to the user of the electronic device even if predetermined input (for example, "Wake up!") for triggering the voice recognition service is not received.

Figure 11:
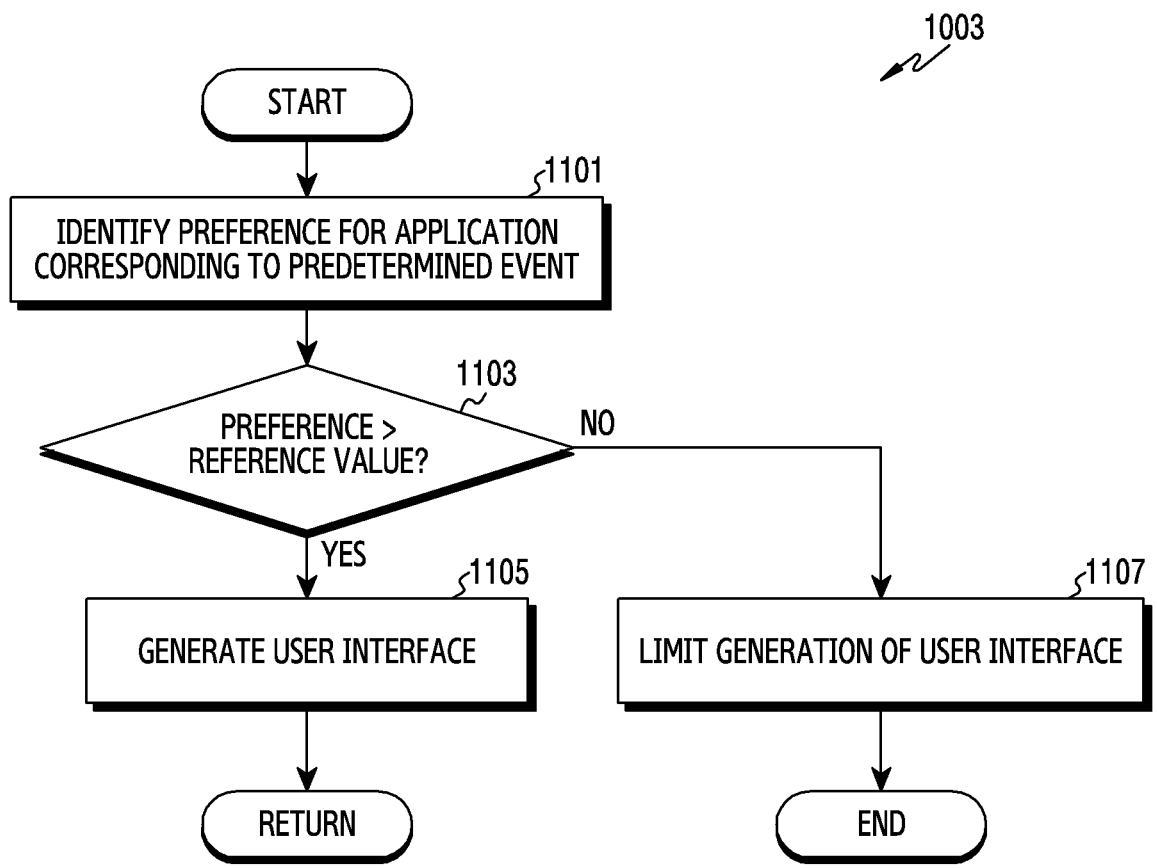
FIG. 11 is a flowchart illustrating an example method by which a server generates a user interface according to various embodiments.

FIG. 11 is a flowchart illustrating an example method by which a server generates a user interface according to various embodiments. The following description is a detailed description of the operation for generating the user interface in operation 1003 of FIG. 10.

Referring to FIG. 11, in operation 1101, a processor (for example, the processor 601 of FIG. 6) of a server (for example, the intelligent server 200 of FIG. 1 or the server 600 of FIG. 6) may identify a preference for an application corresponding to a predetermined event. According to an embodiment, the preference for the application may be configured as an initially predetermined value. According to an embodiment, the preference for the application corresponding to the predetermined event may be configured for each of a plurality of electronic devices using the voice recognition service provided from the server. According to an embodiment, the preference for the application may be configured and changed based on a user-uttered input transmitted from the electronic device. For example, when a user-uttered input for selecting at least one visual object included in a user interface is received from the electronic device, the processor may convert the user-uttered input into text data, analyze the converted text data to identify the visual object selected by the user-uttered input, and change the preference for the application based on a value configured in the identified visual object.

In operation 1103, the processor may determine whether the preference for the application is greater than a reference value. The reference value may be configured as the same value regardless of the application, or may be configured as a different value for each application. According to an embodiment, the reference value may be changed to another value based on a signal received from the electronic device. When the preference for the application corresponding to the predetermined event is greater than the reference value ("Yes" in operation 1103), the processor may perform operation 1105. When the preference for the application corresponding to the predetermined event is less than or equal to the reference value ("No" in operation 1103), the processor may perform operation 1107.

When the preference for the application is greater than the reference value, the processor may generate a user interface including at least one visual object that can be selected by the user in order to control a function of the application corresponding to the predetermined event in operation 1105. For example, the processor may identify an intent corresponding to the predetermined event based on information related to the predetermined event, determine a function corresponding to the intent based on intent information stored in a memory (for example, the memory 603 of FIG. 6), and generate a user interface based on the determined function. In another example, when a capsule corresponding to the application among at least one capsule stored in a memory (for example, the capsule database 230 of FIG. 1 or the memory 603 of FIG. 6) is stored, the processor may generate a user interface based on the capsule corresponding to the application. In another example, when a capsule corresponding to the application among at least one capsule stored in the memory is not stored, the processor may generate a user interface based on a common capsule provided by the server.

When the preference for the application is equal to or less than the reference value, the processor may limit (e.g., restrict) generation of the user interface and terminate the algorithm in operation 1107. According to an embodiment, the processor may transmit a signal indicating that generation of the user interface is restricted to the electronic device through the communication circuit in response to restriction of the generation of the user interface. Accordingly, the server may limit execution of the voice recognition service for applications in the electronic device in which the user is not interested.

Figure 12:
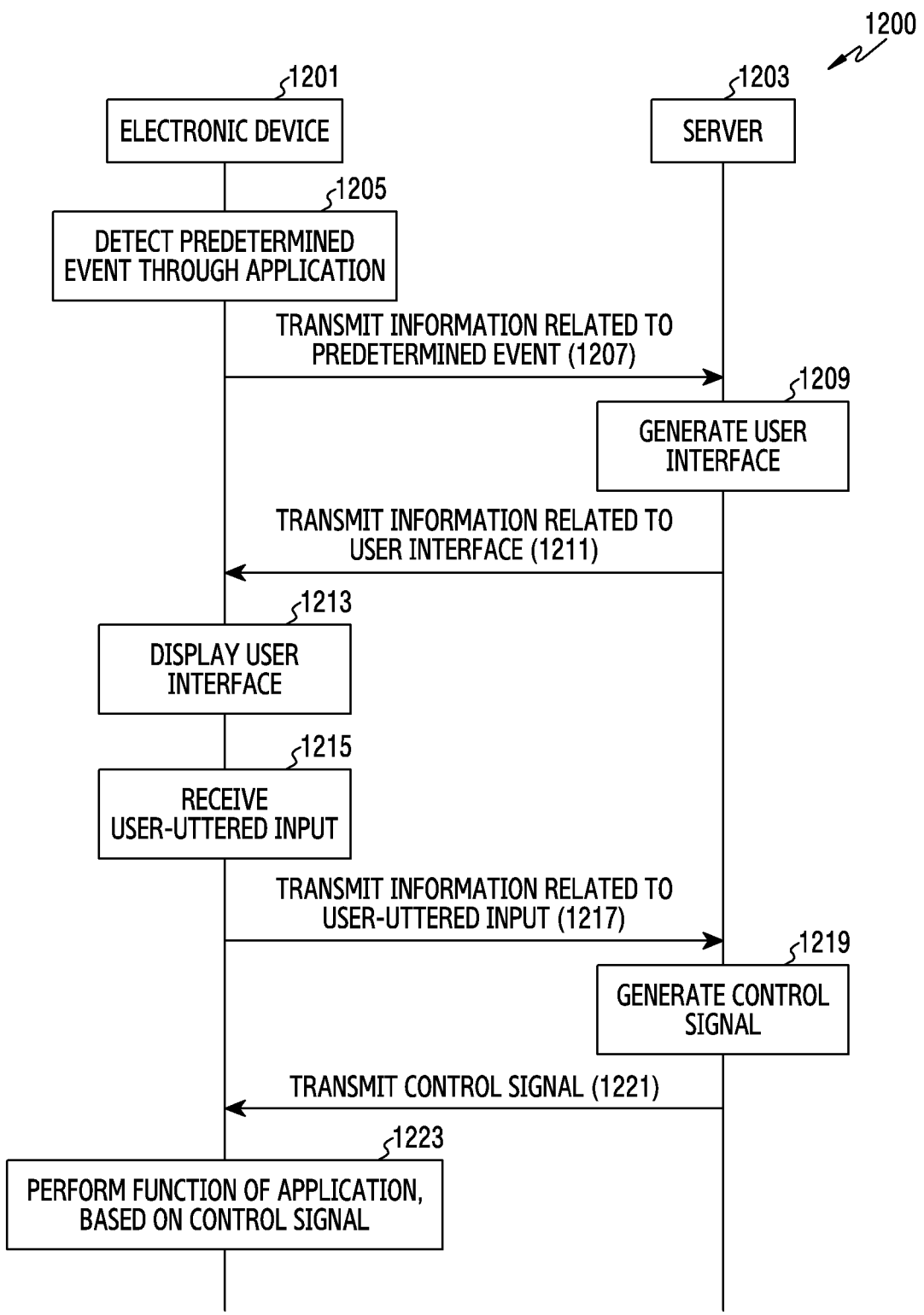
FIG. 12 is a signal flow diagram illustrating an example of signaling between an electronic device and a server according to various embodiments.

FIG. 12 is a signal flow diagram 1200 illustrating an example of signaling between an electronic device and a server according to various embodiments.

Referring to FIG. 12, in operation 1205, an electronic device 1201 (for example, the user terminal 100 of FIG. 1, the electronic device 401 of FIG. 4, or the electronic device 500 of FIG. 5) may detect a predetermined event through an application. For example, when an incoming call screen indicating that a call connection request is received from another electronic device (for example, the electronic device 404 of FIG. 4) is displayed through a call application, the electronic device 1201 may determine that a predetermined event is detected.

In operation 1207, the electronic device 1201 may transmit information related to the predetermined event to a server 1203 (for example, the intelligent server 200 of FIG. 1 or the server 600 of FIG. 6) in response to detection of the predetermined event. According to an embodiment, information related to a predetermined event may include at least one piece of information related to an intent corresponding to the predetermined event, information on the generation of a user interface (for example, a type of the user interface and/or information related to at least one object included in the user interface), or identification information of the electronic device 500. According to an embodiment, information related to a predetermined event may include at least one piece of information on an application, information on a capsule corresponding to an application, information related to a function of an application, information on the generation of a user interface (for example, a type of the user interface and/or information related to at least one object included in the user interface), or identification information of the electronic device 1201.

In operation 1209, the server 1203 may generate a user interface based on information related to the predetermined event transmitted from the electronic device 1201. The user interface may include at least one visual object that can be selected by the user in order to control a function of an application corresponding to the predetermined event.

In operation 1211, the server 1203 may transmit information related to the user interface to the electronic device 1201 in response to generation of the user interface.

In operation 1213, the electronic device 1201 may display the user interface based on the information related to the user interface transmitted from the server 1203. For example, the electronic device 1201 may display the user interface 803 including the plurality of voice commands 803-1 to 803-5 for controlling a function of the call application, as illustrated in FIG. 8A.

In operation 1215, the electronic device 1201 may receive a user-uttered input for selecting one of at least one visual object included in the user interface. For example, the electronic device 1201 may receive a user-uttered input for the first voice command 803-1 among the plurality of voice commands 803-1 to 803-5 included in the user interface 803, as illustrated in FIG. 8A.

In operation 1217, the electronic device 1201 may transmit information related to the user-uttered input to the server.

In operation 1219, the server 1203 may generate a control signal for allowing the electronic device 1201 to perform a function of an application corresponding to the visual object selected by the user-uttered input based on information related to the user-uttered input transmitted from the electronic device 1201. For example, the server 1203 may convert information related to the user-uttered input into text data, analyze the converted text data to identify the visual object selected by the user-uttered input, and generate a control signal for allowing the electronic device 1201 to perform the function of the application corresponding to the identified visual object.

In operation 1221, the server 1203 may transmit the generated control signal to the electronic device 1201.

In operation 1223, the electronic device 1201 may perform the function of the application corresponding to the visual object selected by the user-uttered input based on the control signal transmitted from the server. For example, the electronic device 1201 may perform the function (for example, displaying a call screen and performing a call connection) corresponding to the first voice command 803-1 selected by the user-uttered input, as illustrated in FIG. 8A.

Figure 13:
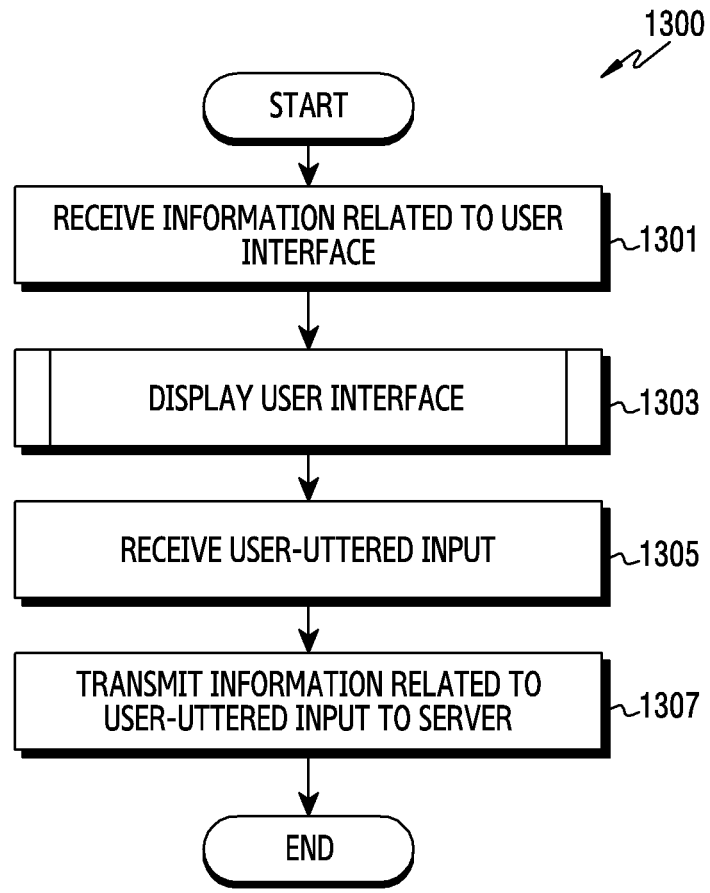
FIG. 13 is a flowchart illustrating another example method by which an electronic device provides a voice recognition service according to various embodiments.
Figure 14A:
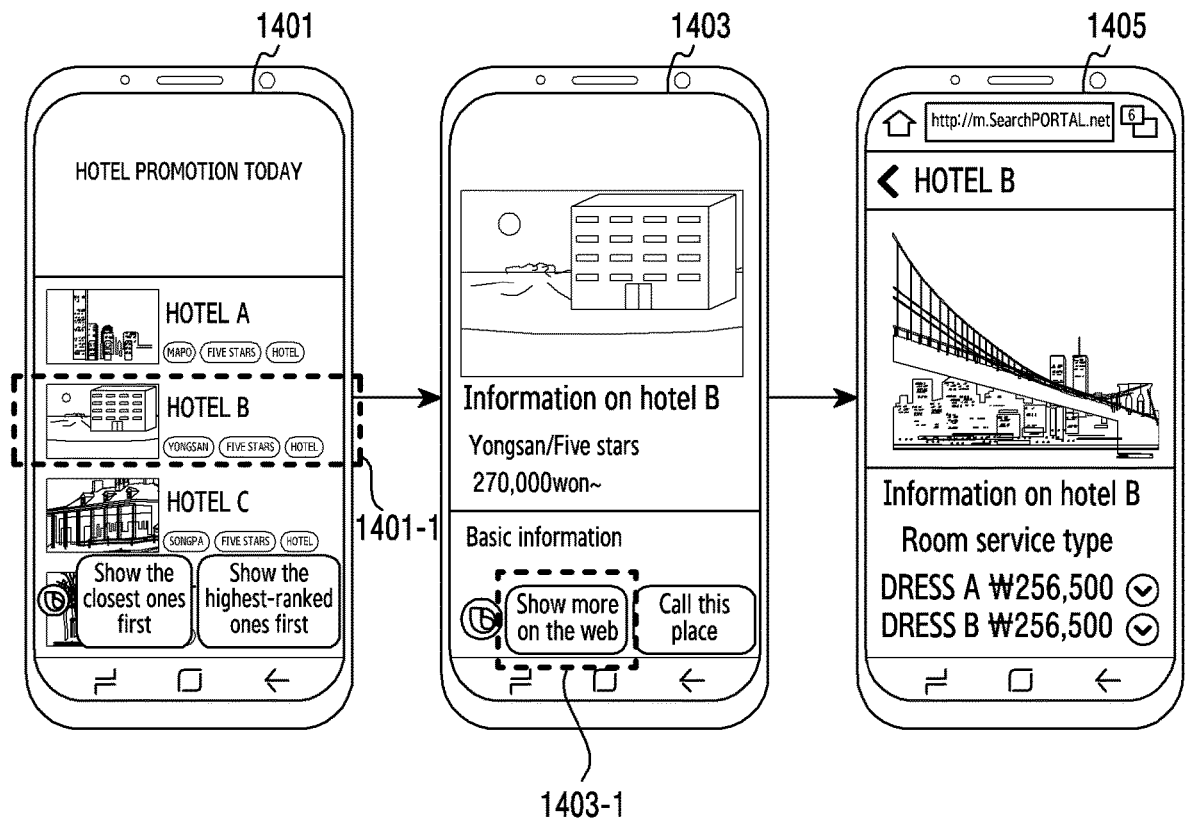
FIG. 14A is a diagram illustrating another example of a user interface that an electronic device provides to a user according to various embodiments.
Figure 14B:
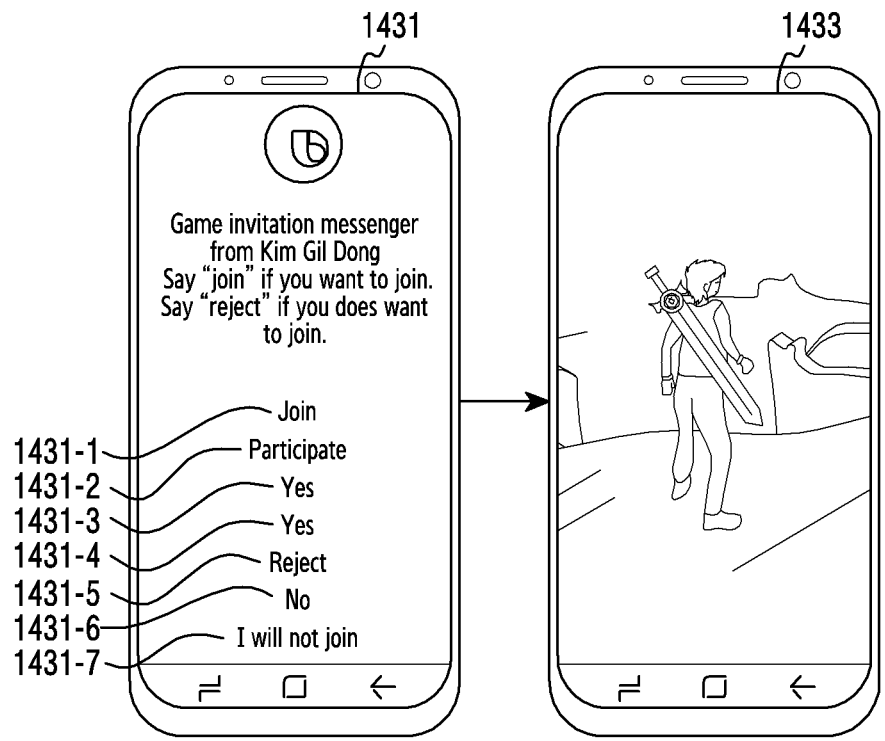
FIG. 14B is a diagram illustrating another example of a user interface that an electronic device provides to a user according to various embodiments.
Figure 14C:
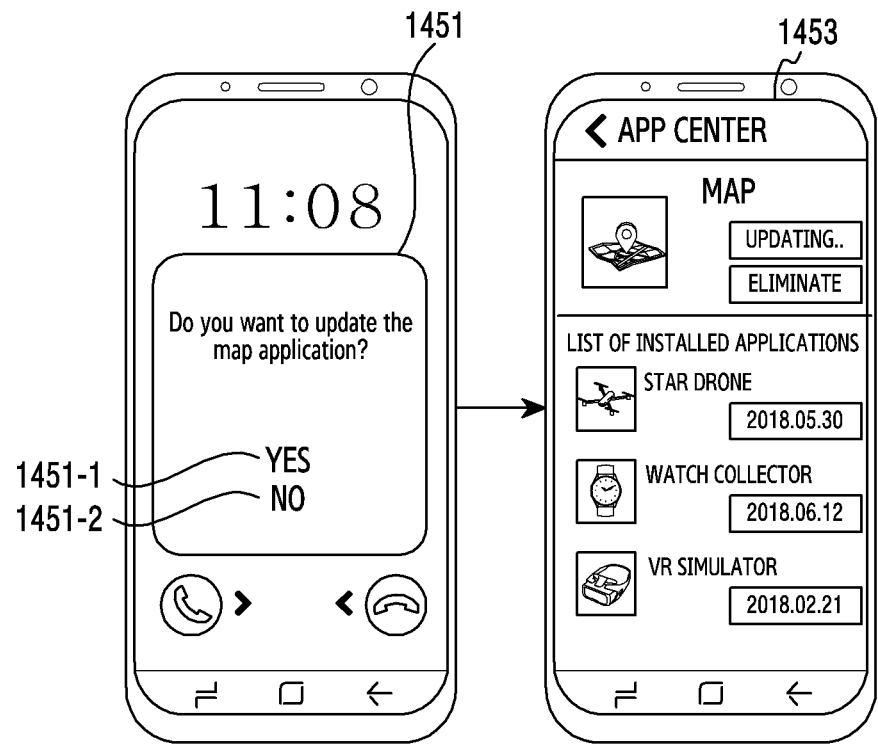
FIG. 14C is a diagram illustrating another example of a user interface that an electronic device provides to a user according to various embodiments.

FIG. 13 is a flowchart 1300 illustrating another example method by which an electronic device provides a voice recognition service according to various embodiments. FIG. 14A is a diagram illustrating another example user interface that an electronic device provides to a user according to various embodiments, FIG. 14B is a diagram illustrating another example user interface that an electronic device provides to a user according to various embodiments, and FIG. 14C is a diagram illustrating another example user interface that an electronic device provides to a user according to various embodiments.

Referring to FIGS. 13, 14A, 14B, and 14C, in operation 1301, a processor (for example, the processor 160 of FIG. 1, the processor 420 of FIG. 4, or the processor 501 of FIG. 5) of an electronic device (for example, the user terminal 100 of FIG. 1, the electronic device 401 of FIG. 4, or the electronic device 500 of FIG. 5) may receive information related to a user interface from a server (for example, the intelligent server 200 of FIG. 1 or the server 600 of FIG. 6) through a communication circuit (for example, the communication interface 110 of FIG. 1, the communication module 490 of FIG. 4, or the communication circuit 507 of FIG. 5).

In operation 1303, the processor may display a user interface for the voice recognition service through a display (for example, the display 140 of FIG. 1, the display device 460 of FIG. 4, or the output device 505 of FIG. 5) based on information related to the user interface. For example, the processor may display a user interface 1401 including a plurality of voice commands for controlling a function of a hotel reservation application through a display, as illustrated in FIG. 14A. In another example, the processor may display a user interface 1431 including a plurality of voice commands 1431-1, 1431-2, 1431-3, 1431-4, 1431-5, 1431-5, 1431-7 (which may be referred to hereinafter as 1431-1 to 1431-7) for controlling a function of a game application through the display, as illustrated in FIG. 14B. In another example, the processor may display a user interface 1451 including a plurality of voice commands 1451-1 and 1451-2 for determining whether to update a specific application (for example, a map application) through the display, as illustrated in FIG. 14C.

According to various embodiments, the processor may determine whether to display a user interface based on a preference for the application corresponding to the user interface. For example, the processor may identify a preference for the application corresponding to the user interface, and may display the user interface through the display only when the preference for the application is greater than a reference value. Accordingly, the electronic device may perform operations for providing the voice recognition service only for applications in which the user is interested.

In operation 1305, the processor may receive a user-uttered input for selecting one of at least one visual object included in the user interface through a microphone (for example, the microphone 120 of FIG. 1, the input device 450 of FIG. 4, or the microphone 509 of FIG. 5). For example, the processor may receive a user-uttered input for a first voice command 1401-1 among the plurality of voice commands included in the user interface 1401, as illustrated in FIG. 14A. In another example, the processor may receive a user-uttered input for a first voice command 1431-1 (or a second voice command 1431-2 or a third voice command 1431-3) among the plurality of voice commands 1431-1 to 1431-7 included in the user interface 1431, as illustrated in FIG. 14B. In another example, the processor may receive a user-uttered input for a first voice command 1451-1 among the plurality of voice commands 1451-1 and 1451-2 included in the user interface 1451, as illustrated in FIG. 14C.

In operation 1307, the processor may transmit information related to a user-uttered input to the server through the communication circuit to perform a function of an application corresponding to the visual object selected by the user-uttered input. According to an embodiment, when the electronic device receives a control signal for performing the function of the application corresponding to the visual object selected by the user-uttered input from the server through the communication circuit, the processor may perform the function of the application corresponding to the visual object selected by the user-uttered input. For example, when a user-uttered input for the first voice command 1401-1 among the plurality of voice commands is received, as illustrated in FIG. 14A, the processor may receive a control signal for allowing the electronic device to display a screen 1403 providing detailed information of a hotel selected by the user-uttered input from a server through a communication circuit and display the screen 1403 providing the detailed information of the hotel selected by the user-uttered input through a display based on the received control signal. In another example, when a user-uttered input for the first voice command 1431-1 among the plurality of voice commands 1431-1 to 1431-7 is received, as illustrated in FIG. 14B, the processor may receive a control signal for allowing the electronic device to perform a game-joining function selected by the user-uttered input from the server through the communication circuit, perform the game joining function of the game application based on the received control signal, and display a game screen 1433 through the display. In another example, when a user-uttered input for the first voice command 1451-1 among the plurality of voice commands 1451-1 and 1451-2 is received, as illustrated in FIG. 14C, the processor may receive a control signal for allowing the electronic device to perform an update function of a specific application from the server through the communication circuit, update the specific application based on the received control signal, and display an update screen 1453 of the specific application through the display.

According to various embodiments, when an additional user-uttered input is received after the function of the application selected by the user-uttered input is performed based on the control signal, the electronic device may provide the voice recognition service according to the additional user-uttered input by performing operations 1305 to 1307 again. For example, when a user-uttered input for the second voice command 1403-1 among the plurality of voice commands included in the screen 1403 providing detailed information of the hotel is received after the screen 1403 providing detailed information of the hotel selected by the user-uttered input is displayed, as illustrated in FIG. 14A, the electronic device may perform operations 1305 to 1307 and display the screen 1405 providing information on the hotel found through a web search.

According to various embodiment, even if predetermined input (for example, "Wake up!") for triggering the voice recognition service is not received, the electronic device may receive the voice recognition service from the server and thus increase the likelihood that the user will use the voice recognition service.

Although it has been described that the electronic device receives the user-uttered input for selecting one of at least one visual object included in the user interface through the microphone, the electronic device may receive the user input for selecting one of at least one visual object included in the user interface through the display or the button according to various embodiments of the disclosure.

Figure 15:
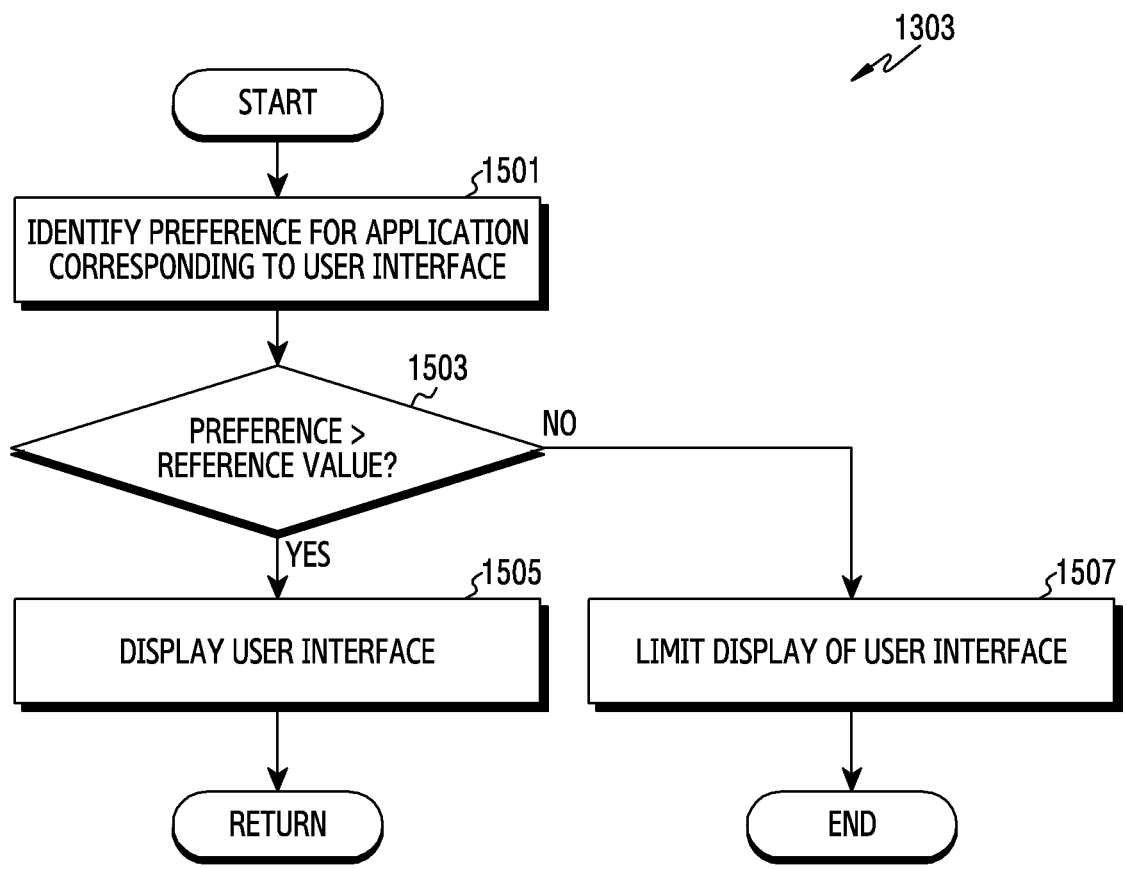
FIG. 15 is a flowchart illustrating an example method by which an electronic device displays a user interface according to various embodiments.

FIG. 15 is a flowchart illustrating an example method by which an electronic device displays a user interface according to various embodiments. The following description is a detailed description of the operation for displaying a user interface in operation 1303 of FIG. 13.

Referring to FIG. 15, in operation 1501, a processor (for example, the processor 160 of FIG. 1, the processor 420 of FIG. 4, or the processor 501 of FIG. 5) of an electronic device (for example, the user terminal 100 of FIG. 1, the electronic device 401 of FIG. 4, or the electronic device 500 of FIG. 5) may identify a preference for an application corresponding to a user interface. For example, the processor may identify the application corresponding to the user interface based on information related to the user interface and identify a preference for the identified application. According to an embodiment, the preference for the application may be configured as an initially predetermined value. According to an embodiment, the processor may change a preference for the application based on a use time of the application, a use frequency, or a user-uttered input for the user interface for the voice recognition service. For example, the processor may record information on the use time or the use frequency for each application in a memory (for example, the memory 150 of FIG. 1, the memory 430 of FIG. 4, or the memory 503 of FIG. 5) and change the preference for each application based on the recorded information. In this case, the preference for the application may be changed to have a higher value as the use time or the use frequency is higher. In another example, when a user-uttered input for selecting at least one visual object included in the user interface is received after the user interface for the voice recognition service for controlling a function of the application is displayed, the processor may record information on the visual object selected by the user-uttered input in a memory and change a preference for the application based on the recorded information. In this case, the preference for the application may be determined based on a preset value for each of at least one visual object included in the user interface.

In operation 1503, the processor may determine whether the preference for the application corresponding to the user interface is greater than a reference value. The reference value may be configured as the same value regardless of the application, or may be configured as a different value for each application. According to an embodiment, the reference value may be changed to another value based on a user input or a signal received from the server. The processor may perform operation 1505 when the preference for the application corresponding to the user interface is greater than the reference value ("Yes" in operation 1503), and may perform operation 1507 when the preference for the application corresponding to the user interface is equal to or less than the reference value ("No" in operation 1503).

When the preference for the application corresponding to the user interface is greater than the reference value, the processor may output (e.g., display) the user interface through a display (for example, the display 140 of FIG. 1, the display device 160 of FIG. 4, or the output device 505 of FIG. 5) in operation 1505. To this end, the electronic device may provide the voice recognition service to the user even if predetermined input (for example, "Wake up!") for triggering the voice recognition service is not received.

When the preference for the application corresponding to the user interface is equal to or less than the reference value, the processor may limit (e.g., restrict) the display of the user interface and terminate the algorithm in operation 1507. Accordingly, the electronic device may limit the voice recognition service for applications that the user does not prefer.

Figure 16:
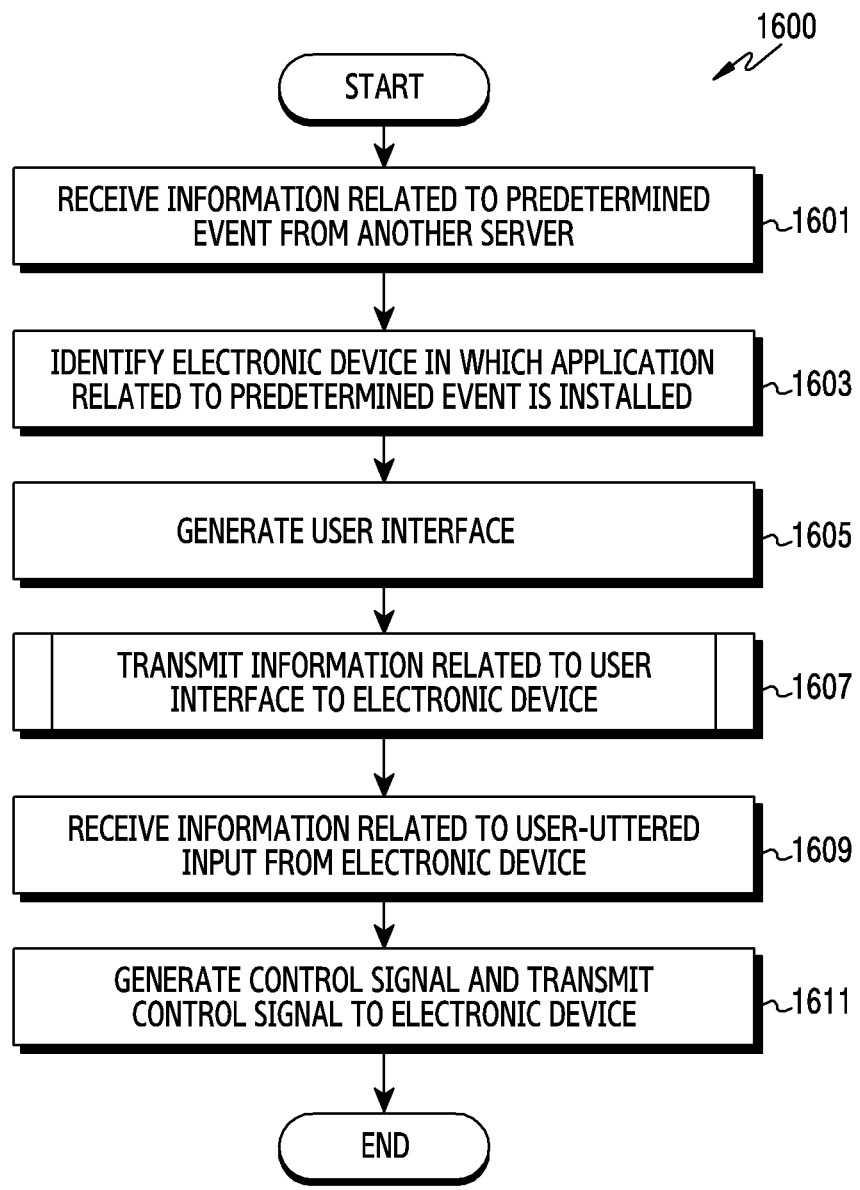
FIG. 16 is a flowchart illustrating another example method by which a server provides a voice recognition service according to various embodiments.

FIG. 16 is a flowchart 1600 illustrating another example method by which a server provides the voice recognition service according to various embodiments.

Referring to FIG. 16, in operation 1601, a processor (for example, the processor 601 of FIG. 6) of a server (for example, the intelligent server 200 of FIG. 1 or the server 600 of FIG. 6) may receive information related to a predetermined event from another server (for example, the service server 300 of FIG. 2). For example, the processor may receive at least one piece of information related to an intent corresponding to the predetermined event, information on the generation of a user interface (for example, a type of the user interface and/or information related to at least one object included in the user interface), identification information of the electronic device, or identification information of the electronic device in which the application is installed from another server through a communication circuit (for example, the communication circuit 605 of FIG. 6). In another example, the processor may receive at least one piece of information of an application corresponding to the predetermined event, information on a capsule corresponding to an application, information related to a function of an application, information on the generation of a user interface (for example, a type of the user interface and/or information related to at least one object included in the user interface), identification information of the electronic device, or identification information of the electronic device in which the application is installed from another server through a communication circuit.

In operation 1603, the processor may identify the electronic device in which the application corresponding to the predetermined event is installed among a plurality of electronic devices using the voice recognition service provided by the server based on information related to the predetermined event. For example, the processor may identify the electronic device in which the application corresponding to the predetermined event is installed based on identification information of the electronic device in which the application is installed transmitted from another server.

In operation 1605, the processor may generate a user interface including at least one visual object that can be selected by the user in order to control a function of an application corresponding to the predetermined event based on information related to the predetermined event. For example, the processor may identify an intent corresponding to the predetermined event based on information related to the predetermined event, determine a function corresponding to the intent based on intent information stored in a memory (for example, the memory 603 of FIG. 6), and generate a user interface based on the determined function. In another example, the processor may identify an application corresponding to the predetermined event based on information related to the predetermined event, determine a capsule corresponding to the identified application among at least one capsule stored in a memory (for example, the capsule database 230 of FIG. 1 or the memory 603 of FIG. 6), and generate a user interface based on the determined capsule. According to an embodiment, the capsule corresponding to the application may be data provided from another server (for example, the service server of FIG. 1).

In operation 1607, the processor may transmit information related to the user interface to the electronic device in which the application corresponding to the predetermined event is installed through the communication circuit in response to generation of the user interface. The electronic device receiving the information related to the user interface may display the user interface based on information received from the server. For example, the electronic device may display the user interface 1401 including a plurality of voice commands for controlling the function of a hotel reservation application based on information related to the user interface, as illustrated in FIG. 14A. According to an embodiment, when the number of electronic devices in which the application corresponding to the predetermined event is installed is plural, the processor may transmit information related to the user interface to each of the electronic devices through the communication circuit.

According to various embodiments, the processor may determine whether to transmit information related to the user interface based on a preference for the application corresponding to the predetermined event. For example, the processor may identify a preference for the application corresponding to the predetermined event, and may transmit the information related to the user interface through the communication circuit only when the identified preference for the application is greater than a reference value. According to an embodiment, the preference for the application may be configured for each electronic device using the voice recognition service provided by the server. According to an embodiment, when the number of electronic devices in which the application corresponding to the predetermined event is installed is plural, the processor may determine whether to transmit information related to the user interface to each electronic device based on the preference for the application configured for each electronic device.

In operation 1609, the processor may receive information (for example, a voice signal) related to a user-uttered input from the electronic device through the communication circuit.

In operation 1611, the processor may generate and transmit a control signal for allowing the electronic device to perform a function of an application corresponding to the visual object selected by the user-uttered input through the communication circuit based on information related to the user-uttered input. For example, the processor may convert information related to the user-uttered input received from the electronic device into text data, analyze the converted text data to identify a visual object selected by the user-uttered input, generate a control signal for performing a function of an application corresponding to the identified visual object, and transmit the generated control signal to the electronic device through the communication circuit.

When information related to the predetermined event is received from another server, the server according to various embodiments may generate a user interface for the voice recognition service and provide the user interface to the electronic device in which the application corresponding to the predetermined event is installed, thereby providing the voice recognition service to the user of the electronic device even if predetermined input (for example, "Wake up!") for triggering the voice recognition service is not received.

Figure 17:
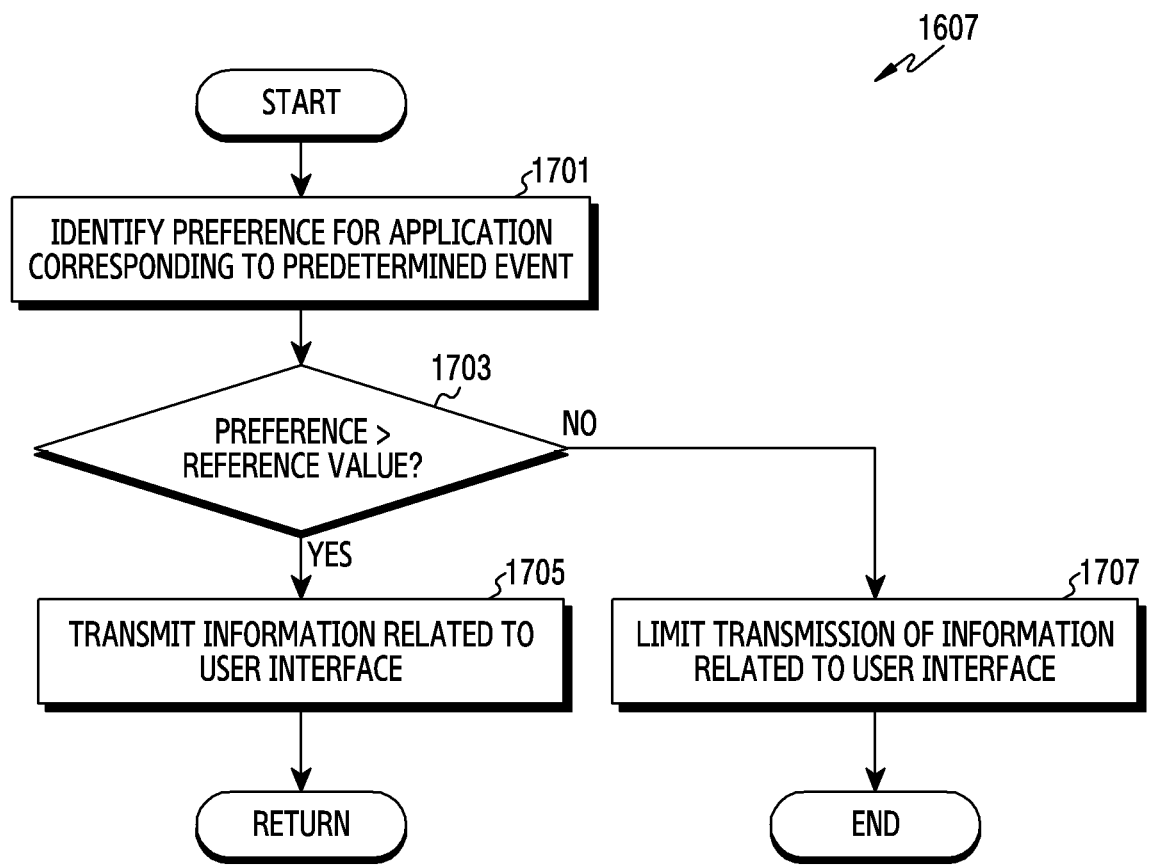
FIG. 17 is a flowchart illustrating another example method by which a server generates a user interface according to various embodiments.

FIG. 17 is a flowchart illustrating another example method by which a server generates a user interface according to various embodiments. The following description is a detailed description of the operation for transmitting information related to a user interface in operation 1607 of FIG. 16.

Referring to FIG. 17, in operation 1701, a processor (for example, the processor 601 of FIG. 6) of a server (for example, the intelligent server 200 of FIG. 1 or the server 600 of FIG. 6) may identify a preference for an application corresponding to a predetermined event. According to an embodiment, the preference for the application may be configured as an initially predetermined value. According to an embodiment, the preference for the application corresponding to the predetermined event may be configured for each of a plurality of electronic devices using the voice recognition service provided from the server. According to an embodiment, the processor may change a preference for the application based on a user-uttered input transmitted from the electronic device. For example, when a user-uttered input for selecting at least one visual object included in a user interface is received from the electronic device, the processor may convert the user-uttered input into text data, analyze the converted text data to identify the visual object selected by the user-uttered input, and change the preference for the application based on a value configured in the identified visual object.

In operation 1703, the processor may determine whether the preference for the application is greater than a reference value. The reference value may be configured as the same value regardless of the application, or may be configured as a different value for each application. According to an embodiment, the reference value may be changed to another value based on a signal received from the electronic device. The reference value may be configured and changed for each electronic device using the voice recognition service provided from the server. When the preference for the application corresponding to the predetermined event is greater than the reference value ("Yes" in operation 1703), the processor may perform operation 1705. When the preference for the application corresponding to the predetermined event is less than or equal to the reference value ("No" in operation 1703), the processor may perform operation 1707.

When the preference for the application corresponding to the predetermined event is greater than the reference value, the processor may transmit information related to the user interface to the electronic device through the communication circuit in operation 1705.

When the preference for the application corresponding to the predetermined event is equal to or less than the reference value, the processor may limit (e.g., restrict) transmission of the information related to the user interface and terminate the algorithm in operation 1707 According to an embodiment, the processor may transmit a signal indicating that generation of the user interface is restricted to the electronic device through the communication circuit in response to restriction of the generation of the user interface. Accordingly, the server may restrict execution of the voice recognition service for applications in the electronic device in which the user is not interested.

Although it has been described that the server determines whether to transmit information related to the user interface to one electronic device in which the application corresponding to the predetermined event is installed, the server may perform operations 1701 to 1707 for each electronic device and determine whether to transmit information related to the user interface when the number of electronic devices in which the application corresponding to the predetermined event is installed is plural.

Figure 18:
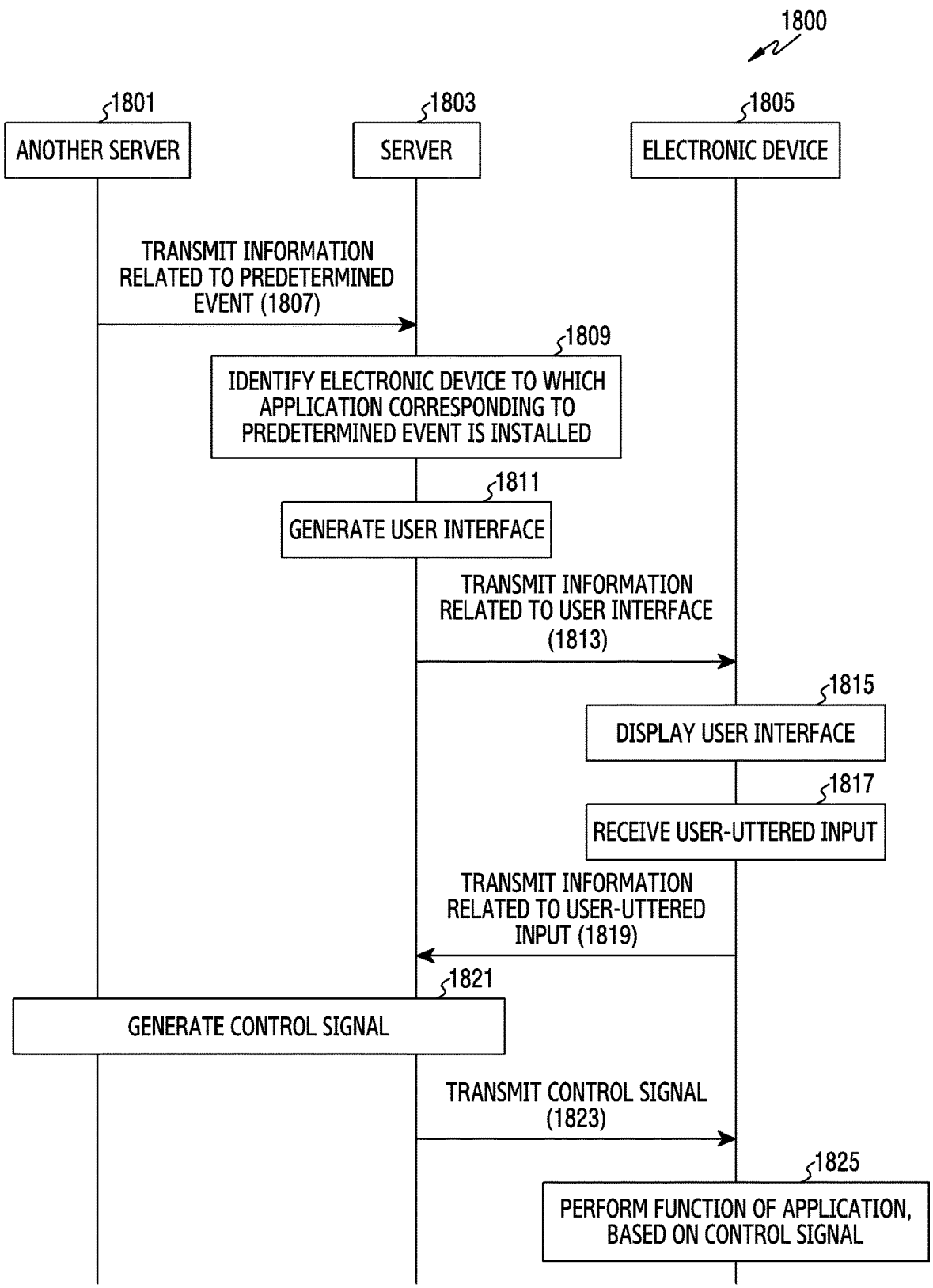
FIG. 18 is a signal flow diagram illustrating another example of signaling between an electronic device and a server according to various embodiments.

FIG. 18 is a signal flow diagram 1800 illustrating another example of signaling between an electronic device and a server according to various embodiments.

Referring to FIG. 18, in operation 1807, another server 1801 (for example, the service server 300 of FIG. 1) may transmit information related to a predetermined event to a server 1803 (for example, the intelligent server 200 of FIG. 1 or the server 600 of FIG. 6). According to an embodiment, information related to a predetermined event may include at least one piece of information related to an intent corresponding to the predetermined event, information on the generation of a user interface (for example, a type of the user interface and/or information related to at least one object included in the user interface), identification information of the electronic device, or identification information of the electronic device in which an application is installed. According to an embodiment, information related to a predetermined event may include at least one piece of information on an application, information on a capsule corresponding to an application, information related to a function of an application, information on the generation of a user interface (for example, a type of the user interface and/or information related to at least one object included in the user interface), identification information of the electronic device, or identification information of the electronic device in which an application is installed.

In operation 1809, the server 1803 may identify the electronic device in which the application corresponding to the predetermined event is installed among a plurality of electronic devices using the voice recognition service provided by the server based on the information related to the predetermined event.

In operation 1811, the server 1803 may generate a user interface including at least one visual object that can be selected by the user in order to control a function of the application corresponding to the predetermined event based on the information related to the predetermined event.

In operation 1813, the server 1803 may transmit information related to the user interface to the electronic device 1805 in response to generation of the user interface. According to an embodiment, when the number of electronic devices in which the application corresponding to the predetermined event is installed is plural, the server 1803 may transmit the information related to the user interface to each of the electronic devices.

In operation 1815, the electronic device 1805 may display the user interface based on the information related to the user interface received from the server 1803. For example, the electronic device 1805 may display the user interface 1401 including a plurality of voice commands for controlling the function of the hotel reservation application, as illustrated in FIG. 14A.

In operation 1817, the electronic device 1805 may receive a user-uttered input for selecting one of at least one visual object included in the user interface. For example, the electronic device 1805 may receive a user-uttered input for the first voice command 140-1 among the plurality of voice commands included in the user interface 1401, as illustrated in FIG. 14A.

In operation 1819, the electronic device 1805 may transmit information related to the user-uttered input to the server 1803.

When the information related to the user-uttered input transmitted from the electronic device 1805 is received, the server 1803 may generate a control signal for allowing the electronic device 1805 to perform a function of an application corresponding to the visual object selected by the user-uttered input in operation 1821. For example, the server 1803 may convert the information related to the user-uttered input into text data, analyze the converted text data to identify the visual object selected by the user-uttered input, make a request for information used to generate a control signal for performing the function of the application corresponding to the visual object to another server 1801, receive the information, and generate the control signal using the received information. According to various embodiments, the server 1803 may generate the control signal without the request for additional information to another server. According to an embodiment, when information related to the user-uttered input is received from a plurality of electronic devices, the server 1803 may generate a control signal for each of the electronic devices.

In operation 1823, the server 1803 may transmit the generated control signal to the electronic device 1805. According to an embodiment, when a plurality of control signals for respective electronic devices is generated because the information related to the user-uttered input is received from the plurality of electronic devices, the server 1803 may provide the generated control signals to the respective electronic devices based on the information related to the user-uttered input received from the electronic devices.

In operation 1825, the electronic device 1805 may perform the function of the application corresponding to the visual object selected by the user-uttered input based on the control signal transmitted from the server 1803. For example, the electronic device 1805 may perform a function (for example, displaying a screen for providing detailed information of a hotel selected by the utterance input) corresponding to the first voice command 140-1 selected by the user-uttered input.

A method of operating an electronic device (for example, the user terminal 100 of FIG. 1, the electronic device 401 of FIG. 4, or the electronic device 500 of FIG. 5) according to various example embodiments may include an operation of transmitting information related to a predetermined event to a server (for example, the intelligent server 200 of FIG. 1 or the server 600 of FIG. 6) through the communication circuit in response to detection of the predetermined event through an application, an operation of displaying a user interface through the display in response to reception of information related to the user interface including at least one visual object selectable by a user to control a function of the application through the communication circuit, an operation of receiving a user-uttered input for selecting one of the at least one visual object included in the user interface through the microphone of the electronic device, and an operation of transmitting information related to the user-uttered input to the server through the communication circuit to perform a function corresponding to the visual object selected by the user-uttered input.

According to various example embodiments, the method of operating the electronic device may further include an operation of receiving a control signal for performing a function of an application corresponding to the visual object selected by the user-uttered input from the server through the communication circuit and an operation of performing the function of the application corresponding to the visual object selected by the user-uttered input.

According to various example embodiments, the information related to the predetermined event may include at least one piece of information on an application corresponding to the predetermined event, information related to a function of the application, information on generation of the user interface, or identification information of the electronic device.

According to various example embodiments, information related to the predetermined event may include at least one piece of information related to an intent corresponding to the predetermined event, information on generation of the user interface, or identification information of the electronic device.

According to various example embodiments, the operation of transmitting the information related to the predetermined event to the server may include an operation of identifying a preference for the application in response to detection of the predetermined event, an operation of determining whether the preference for the application is greater than a reference value, and when the preference for the application is greater than the reference value, an operation of transmitting the information related to the predetermined event to the server through the communication circuit.

According to various example embodiments, the method of operating the electronic device may further include an operation of limiting transmission of the information related to the predetermined event when the preference for the application is not greater than the reference value.

According to various example embodiments, the method of operating the electronic device may further include an operation of controlling the preference for the application based on a use time of the application, a use frequency, or the user-uttered input.

According to various example embodiments, the method of operating the electronic device may further include an operation of limiting transmission of the information related to the predetermined event when the electronic device does not operate in a predetermined mode.

A method of operating a server (for example, the intelligent server 200 of FIG. 1 or the server 600 of FIG. 6) according to various example embodiments may include an operation of receiving information related to a predetermined event from an electronic device (for example, the user terminal 100 of FIG. 1, the electronic device 401 of FIG. 4, or the electronic device 500 of FIG. 5) through the communication circuit (for example, the communication circuit 605 of FIG. 6), an operation of generating a user interface including at least one visual object selectable by a user to control a function of an application corresponding to the predetermined event based on the information related to the predetermined event, an operation of transmitting information related to the user interface to the electronic device through the communication circuit, an operation of receiving information related to a user-uttered input for selecting one of the at least one visual object included in the user interface from the electronic device through the communication circuit, and an operation of transmitting a control signal for performing a function of an application corresponding to the visual object selected by the user-uttered input to the electronic device through the communication circuit based on the information related to the user-uttered input.

According to various example embodiments, the information related to the predetermined event may include at least one piece of information on an application corresponding to the predetermined event, information related to a function of the application, information on generation of the user interface, or identification information of the electronic device.

According to various example embodiments, the operation of generating the user interface including the at least one visual object that can be selected by the user may include an operation of selecting an application corresponding to a predetermined event, among at least one application stored in the memory based on the information related to the predetermined event and an operation of generating the user interface based on the selected application.

According to various example embodiments, information related to the predetermined event may include at least one piece of information related to an intent corresponding to the predetermined event, information on generation of the user interface, or identification information of the electronic device.

According to various example embodiments, the operation of generating the user interface including the at least one visual object that can be selected by the user may include an operation of identifying an intent corresponding to the predetermined event based on the information related to the predetermined event, an operation of determining a function corresponding to the intent based on intent information stored in the memory, and an operation of generating the user interface based on the determined function.

According to various example embodiments, the operation of generating the user interface including the at least one visual object that can be selected by the user may include an operation of identifying a preference for the application in response to reception of the information related to the predetermined event from the electronic device, an operation of determining whether the preference for the application is greater than a reference value, and an operation of generating the user interface when the preference for the application is greater than the reference value.

According to various example embodiments, the method of operating the server may include an operation of restricting generation associated with the predetermined event when the preference for the application is equal to or smaller than the reference value.

A method of operating a server (for example, the intelligent server 200 of FIG. 1 or the server 600 of FIG. 6) according to various example embodiments may include an operation of receiving information related to a predetermined event from another server through the communication circuit (for example, the communication circuit 605 of FIG. 6), an operation of identifying an electronic device (for example, the user terminal 100 of FIG. 1, the electronic device 401 of FIG. 4, or the electronic device 500 of FIG. 5) to which an application corresponding to the predetermined event is installed, an operation of generating a user interface including at least one visual object selectable by a user to control a function of the application corresponding to the predetermined event based on the information related to the predetermined event, an operation of transmitting information related to the user interface to the electronic device through the communication circuit, an operation of receiving information related to a user-uttered input for selecting one of the at least one visual object included in the user interface from the electronic device through the communication circuit, and an operation of transmitting a control signal for performing a function corresponding to the visual object selected by the user-uttered input to the electronic device through the communication circuit based on the information related to the user-uttered input.

According to various example embodiments, the information related to the predetermined event may include at least one piece of information on an application corresponding to the predetermined event, information related to a function of the application, information on generation of the user interface, identification information of the electronic device, or identification information of the electronic device in which the application is installed.

According to various example embodiments, the operation of generating the user interface including the at least one visual object that can be selected by the user may include an operation of selecting an application corresponding to a predetermined event, among at least one application stored in the memory (for example, the memory 603 of FIG. 6) based on the information related to the predetermined event and an operation of generating the user interface based on the selected application.

According to various example embodiments, the information related to the predetermined event may include at least one piece of information related to an intent corresponding to the predetermined event, information on generation of the user interface, identification information of the electronic device, or identification information of the electronic device to which the application is installed.

According to various example embodiments, the operation of generating the user interface including the at least one visual object that can be selected by the user may include an operation of identifying an intent corresponding to the predetermined event based on the information related to the predetermined event, an operation of determining a function corresponding to the intent based on intent information stored in the memory, and an operation of generating the user interface based on the determined function.

An electronic device and a method of the same according to various example embodiments can increase the tendency of a user to use a voice recognition service because the electronic device provides the voice recognition service to the user based on a predetermined event even though a user-uttered input is not detected.

Effects which can be acquired by the disclosure are not limited to the above described effects, and other effects that have not been mentioned may be clearly understood by those skilled in the art from the following description.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor(e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the example embodiments are intended to be illustrative, not limiting. One or ordinary skill in the art will understand that various changes in form and detail may be made without departing form the true spirit and full scope of the disclosure, including the appended claims and their equivalents.

What is claimed is:

1. An electronic device comprising:
   a communication circuit;
   a display;
   a microphone;
   a processor operatively connected to the communication circuit, the display, and the microphone; and
   a memory operatively connected to the processor,
   wherein the memory is configured to store instructions which, when executed, cause the processor to control the electronic device to:
   detect a predetermined event through application,
   identify a preference for the application, wherein the preference for the application has a value based on recorded user-uttered input information to control a function of the application,
   in response to the preference being greater than or equal to a reference value, transmit information related to the predetermined event to a server through the communication circuit in response to detection of the predetermined event through an application, wherein the predetermined event is performed by the application in response to receiving a communication request or a message from an external device through the communication circuit,
   display a user interface through the display in response to reception of information related to the user interface through the communication circuit from the server, the user interface including at least one visual object selectable by a user to control a function of the application,
   receive a user-uttered input for selecting one of the at least one visual object included in the user interface through the microphone, and
   transmit information related to the user-uttered input to the server through the communication circuit to perform a function corresponding to the visual object selected by the user-uttered input,
   wherein the information related to the predetermined event includes information on generation of the user interface.

2. The electronic device of claim 1, wherein the instructions, when executed, further cause the processor to control the electronic device to: receive a control signal for performing a function of an application corresponding to the visual object selected by the user-uttered input from the server through the communication circuit and perform the function of the application corresponding to the visual object selected by the user-uttered input.

3. The electronic device of claim 1, wherein the information related to the predetermined event comprises at least one piece of information on an application corresponding to the predetermined event, information on generation of the user interface, or identification information of the electronic device.

4. The electronic device of claim 1, wherein the information related to the predetermined event comprises at least one piece of information related to an intent corresponding to the predetermined event, or identification information of the electronic device.

5. The electronic device of claim 1, wherein the instructions, when executed, further cause the processor to control the electronic device to: identify a preference for the application in response to detection of the predetermined event, determine whether the preference for the application is greater than a reference value, and based on the preference for the application being greater than the reference value, transmit the information related to the predetermined event to the server through the communication circuit.

6. The electronic device of claim 5, wherein the instructions, when executed, further cause the processor to control the electronic device to restrict transmission of the information related to the predetermined event based on the preference for the application not being greater than the reference value.

7. The electronic device of claim 5, wherein the instructions, when executed, further cause the processor to control the electronic device to control the preference for the application based on a use time of the application, a use frequency, or the user-uttered input.

8. The electronic device of claim 1, wherein the instructions, when executed, further cause the processor to control the electronic device to limit transmission of the information related to the predetermined event based on the electronic device not operating in a predetermined mode.

9. A server comprising:
a communication circuit;
a processor operatively connected to the communication circuit; and
a memory operatively connected to the processor,
wherein the memory is configured to store instructions which, when executed, cause the processor to control the server to:
receive information related to a predetermined event from an electronic device through the communication circuit, wherein the predetermined event is performed by an application executed by the electronic device in response to receiving a communication request or a message,
identify a preference for the application in response to reception of the information related to the predetermined event, the preference for the application has a value based on recorded user-uttered input information to control a function of the application,
in response to the preference for the application being greater than or equal to a reference value, generate a user interface including at least one visual object selectable by a user to control a function of an application corresponding to the predetermined event based on the information related to the predetermined event, wherein the received information related to the predetermined event includes information on generation of the user interface and the user interface is generated based on the received information on generation of the user interface,
transmit information related to the user interface to the electronic device through the communication circuit,
receive information related to a user-uttered input for selecting one of the at least one visual object included in the user interface from the electronic device through the communication circuit, and
transmit a control signal for performing a function of an application corresponding to the visual object selected by the user-uttered input to the electronic device through the communication circuit based on the information related to the user-uttered input.

10. The server of claim 9, wherein the information related to the predetermined event comprises at least one piece of information on an application corresponding to the predetermined event, information related to a function of the application, or identification information of the electronic device.

11. The server of claim 9, wherein the instructions, when executed, cause the processor to control the server to: select an application corresponding to the predetermined event among at least one application stored in the memory based on the information related to the predetermined event and generate the user interface based on the selected application.

12. The server of claim 9, wherein the information related to the predetermined event comprises at least one piece of information related to an intent corresponding to the predetermined event, or identification information of the electronic device.

13. The server of claim 12, wherein the instructions, when executed, further cause the processor to control the server to: identify an intent corresponding to the predetermined event based on the information related to the predetermined event, determine a function corresponding to the intent based on intent information stored in the memory, and generate the user interface based on the determined function.

14. The server of claim 9, wherein the instructions, when executed, further cause the processor to control the server to: identify a preference for the application in response to reception of the information related to the predetermined event from the electronic device, determine whether the preference for the application is greater than a reference value, and generate the user interface based on the preference for the application being greater than the reference value.

15. The server of claim 14, wherein the instructions, when executed, further cause the processor to control the server to restrict generation associated with the predetermined event based on the preference for the application being equal to or less than the reference value.

16. A server comprising:
a communication circuit;
a processor operatively connected to the communication circuit; and
a memory operatively connected to the processor,
wherein the memory is configured to store instructions which, when executed, cause the processor to control the server to:
receive information related to a predetermined event from another server through the communication circuit from an electronic device, wherein the predetermined event is performed by an application executed by the electronic device in response to receiving a communication request or a message,
identify the electronic device in which the application corresponding to the predetermined event is installed,
identify a preference for the application in response to reception of the information related to the predetermined event, the preference for the application has a value based on recorded user-uttered input information to control a function of the application,
in response to the preference for the application being greater than or equal to a reference value, generate a user interface including at least one visual object selectable by a user to control a function of the application corresponding to the predetermined event based on the information related to the predetermined event and the identified electronic device, wherein the received information related to the predetermined event includes information on generation of the user interface and the user interface is generated based on the received information on generation of the user interface,
transmit information related to the user interface to the electronic device through the communication circuit,
receive information related to a user-uttered input for selecting one of the at least one visual object included in the user interface from the electronic device through the communication circuit, and
transmit a control signal for performing a function corresponding to the visual object selected by the user-uttered input to the electronic device through the communication circuit based on the information related to the user-uttered input.

17. The server of claim 16, wherein the information related to the predetermined event comprises at least one piece of information on an application corresponding to the predetermined event, information related to a function of the application, information on generation of the user interface, identification information of the electronic device, or identification information of the electronic device to which the application is installed.

18. The server of claim 17, wherein the instructions, when executed, further cause the processor to control the server to:

select an application corresponding to the predetermined event among at least one application stored in the memory based on the information related to the predetermined event and generate the user interface based on the selected application.

19. The server of claim 16, wherein the information related to the predetermined event comprises at least one piece of information related to an intent corresponding to the predetermined event, information on generation of the user interface, identification information of the electronic device, or identification information of the electronic device to which the application is installed.

20. The server of claim 19, wherein the instructions, when executed, further cause the processor to control the server to: identify an intent corresponding to the predetermined event based on the information related to the predetermined event, determine a function corresponding to the intent based on intent information stored in the memory, and generate the user interface based on the determined function.

* * * * *